M. E. PETERS.
MACHINE FOR GUMMING BLANKS FOR COVERING BOXES AND FOR OTHER PURPOSES.
APPLICATION FILED FEB. 23, 1915.
1,222,983.
Patented Apr. 17, 1917.
10 SHEETS—SHEET 8.
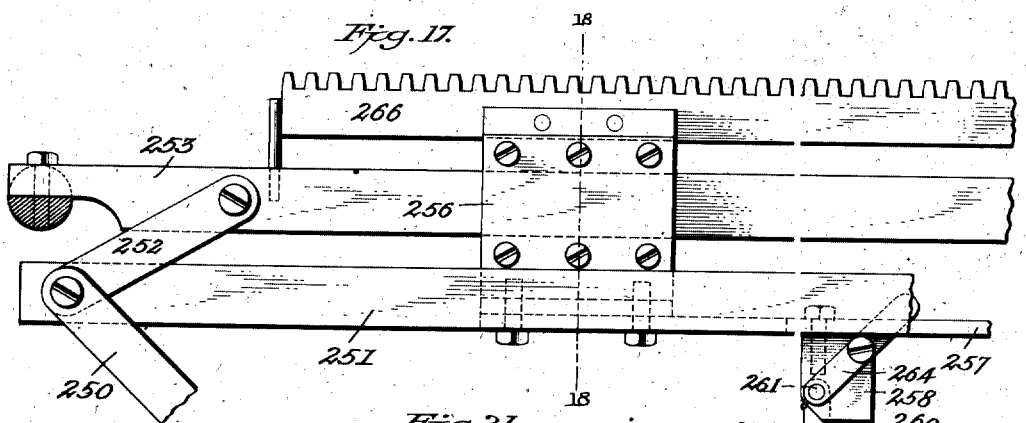
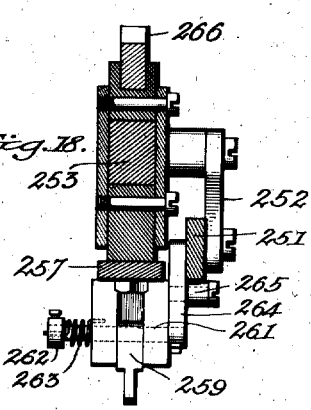
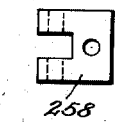
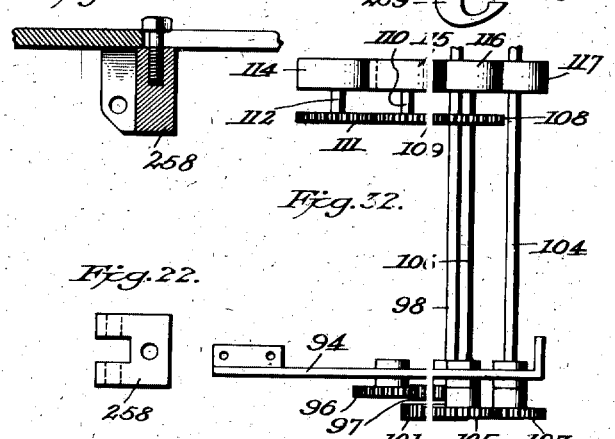
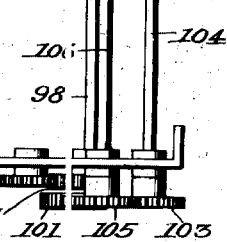
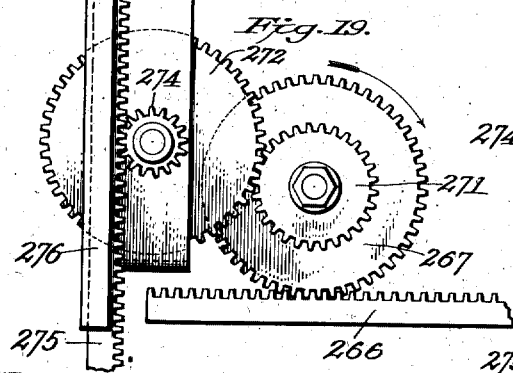
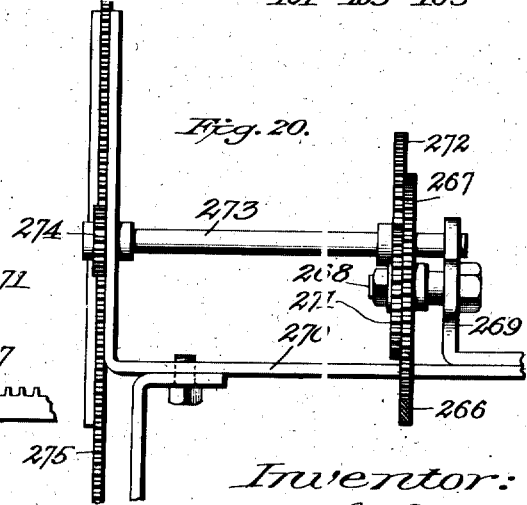
Witnesses:
G. Sargent Elliott
Katherine V. Baker
Inventor:
Melville E. Peters
By H. S. Bailey Attorney

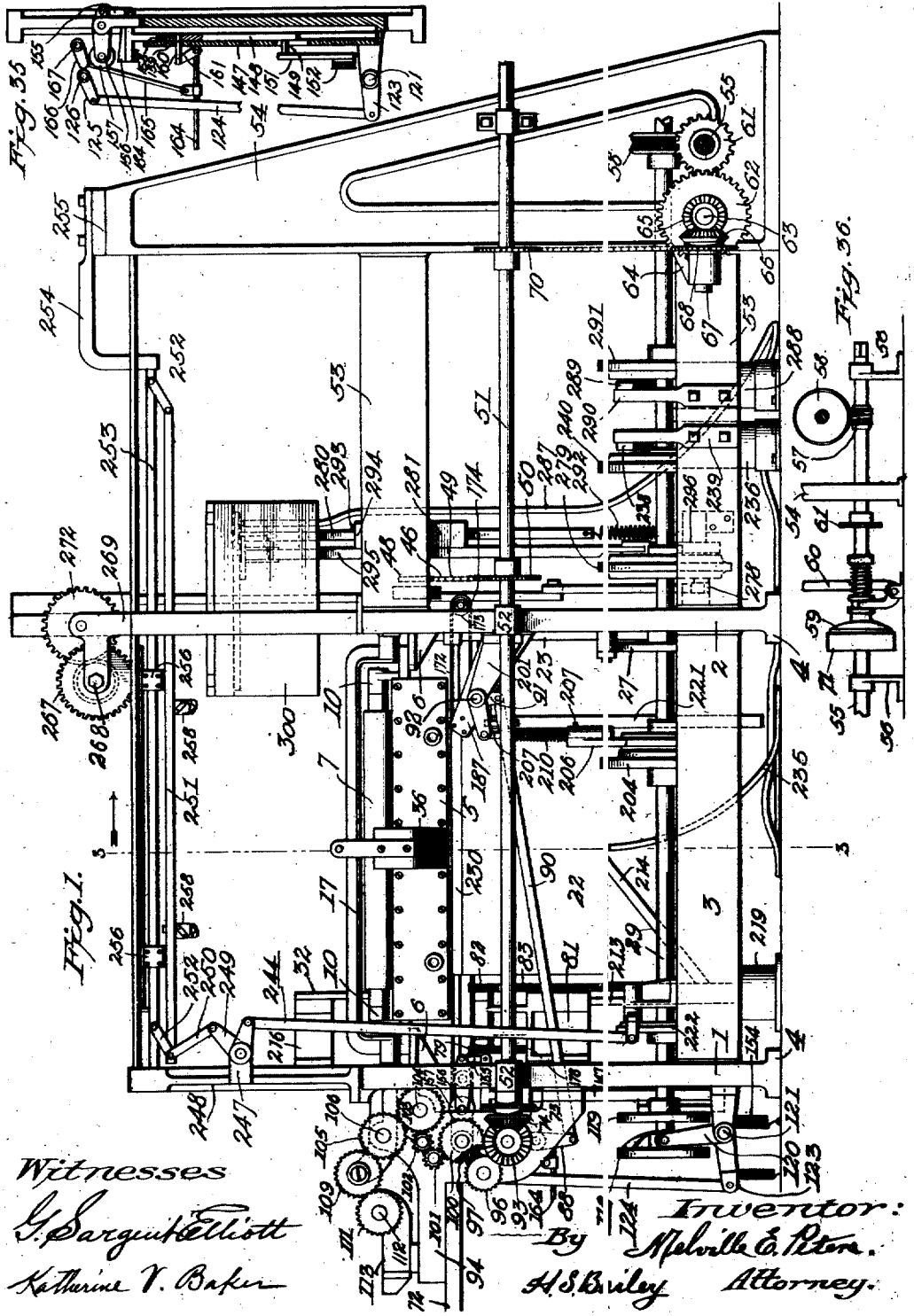

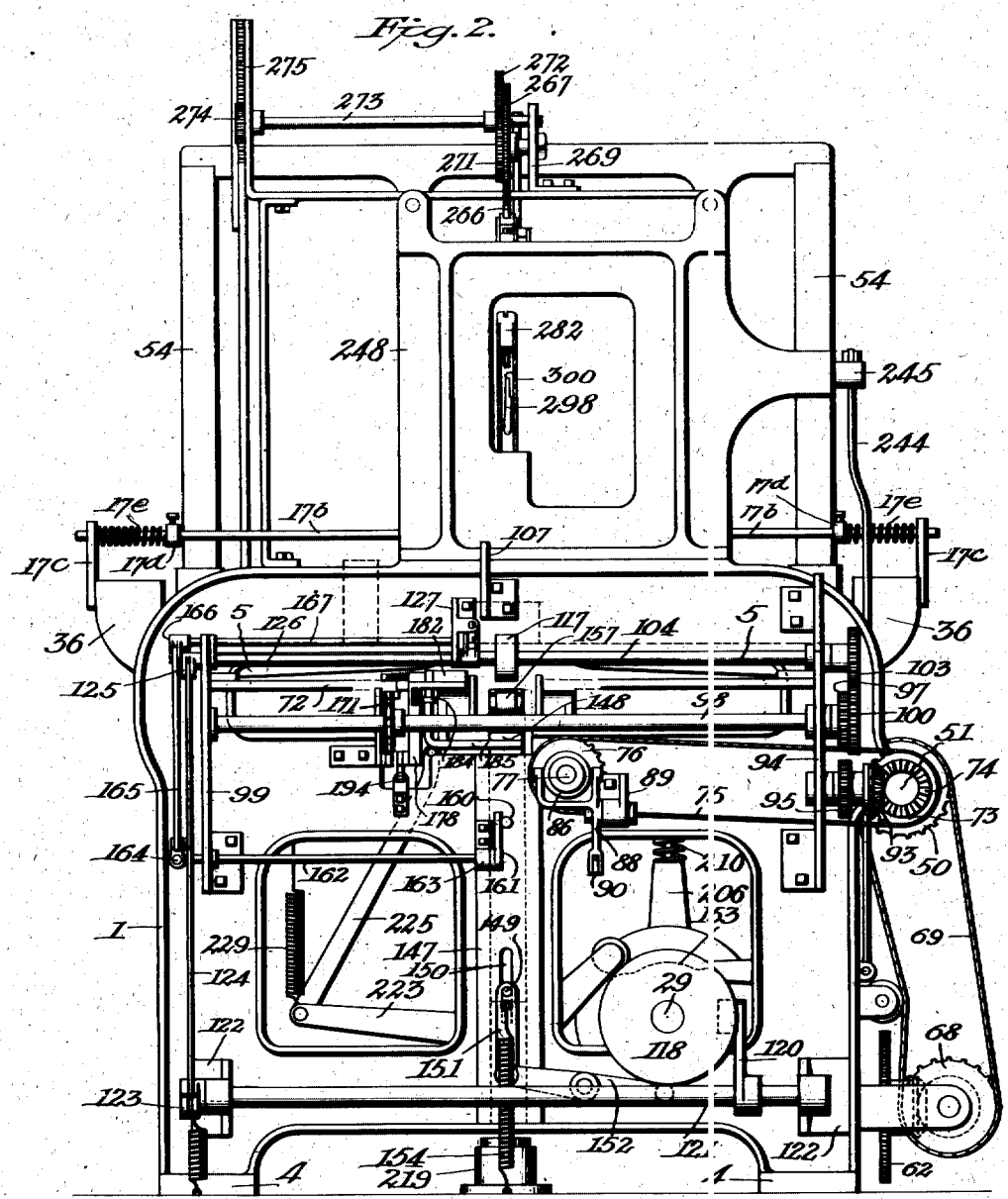

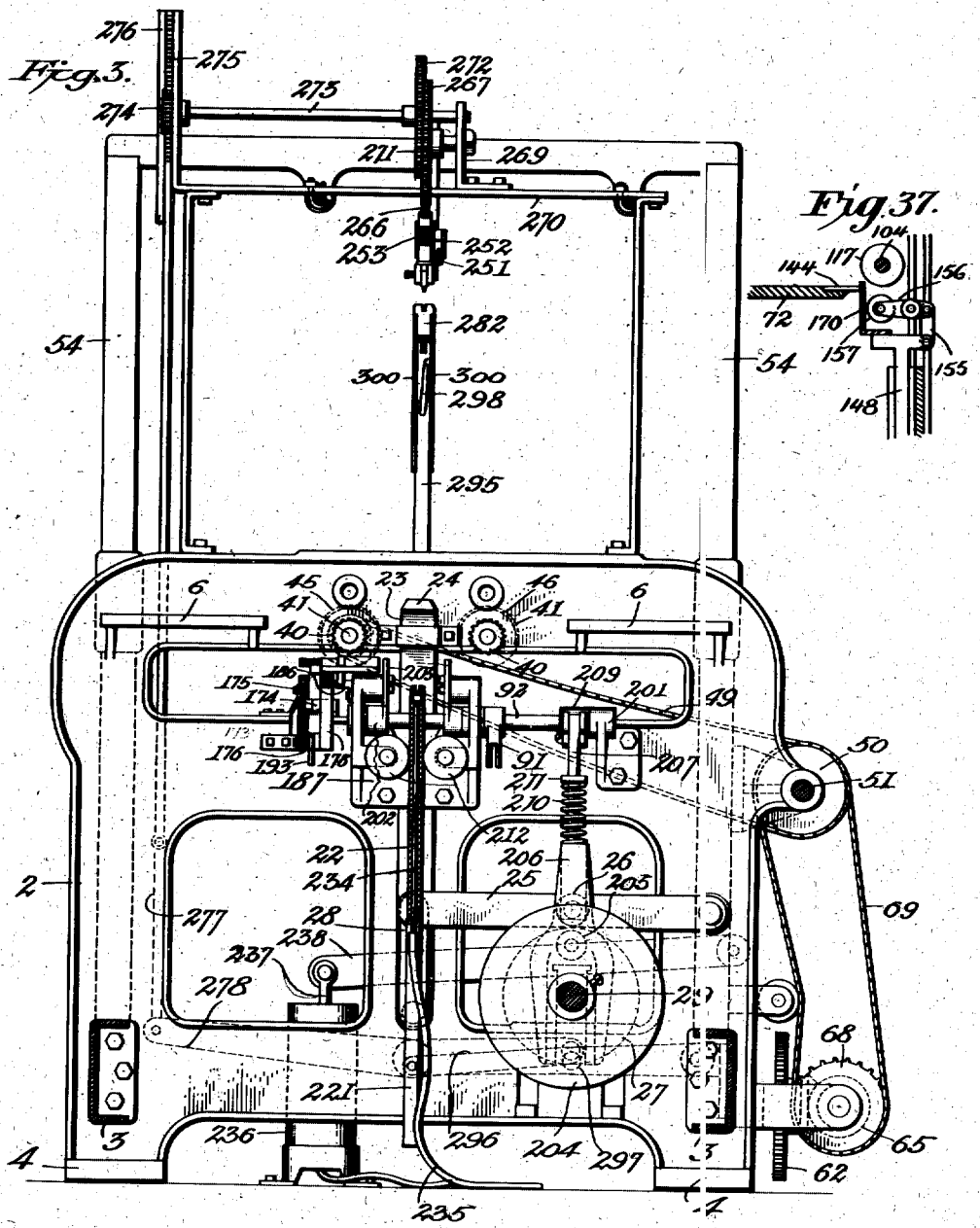

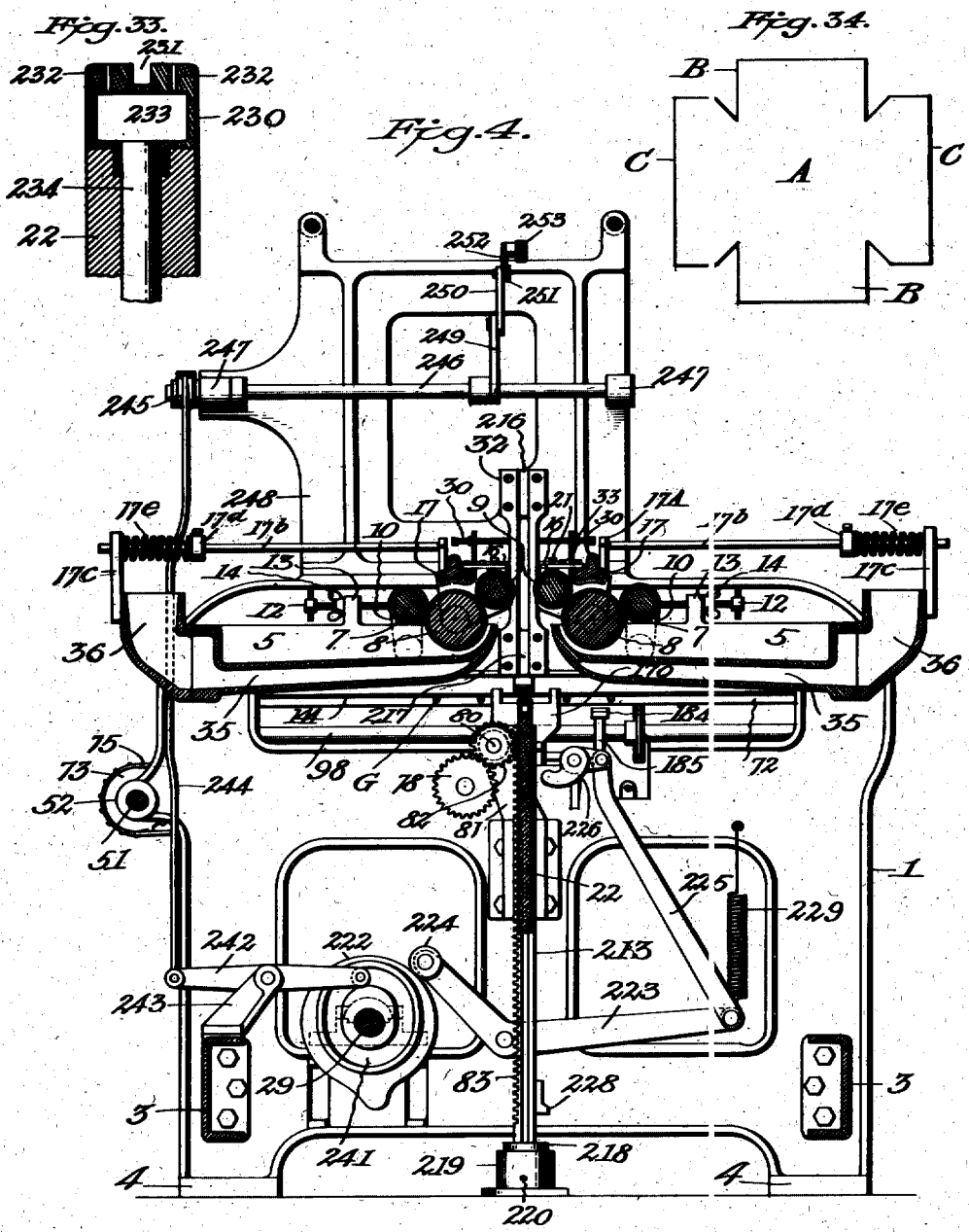

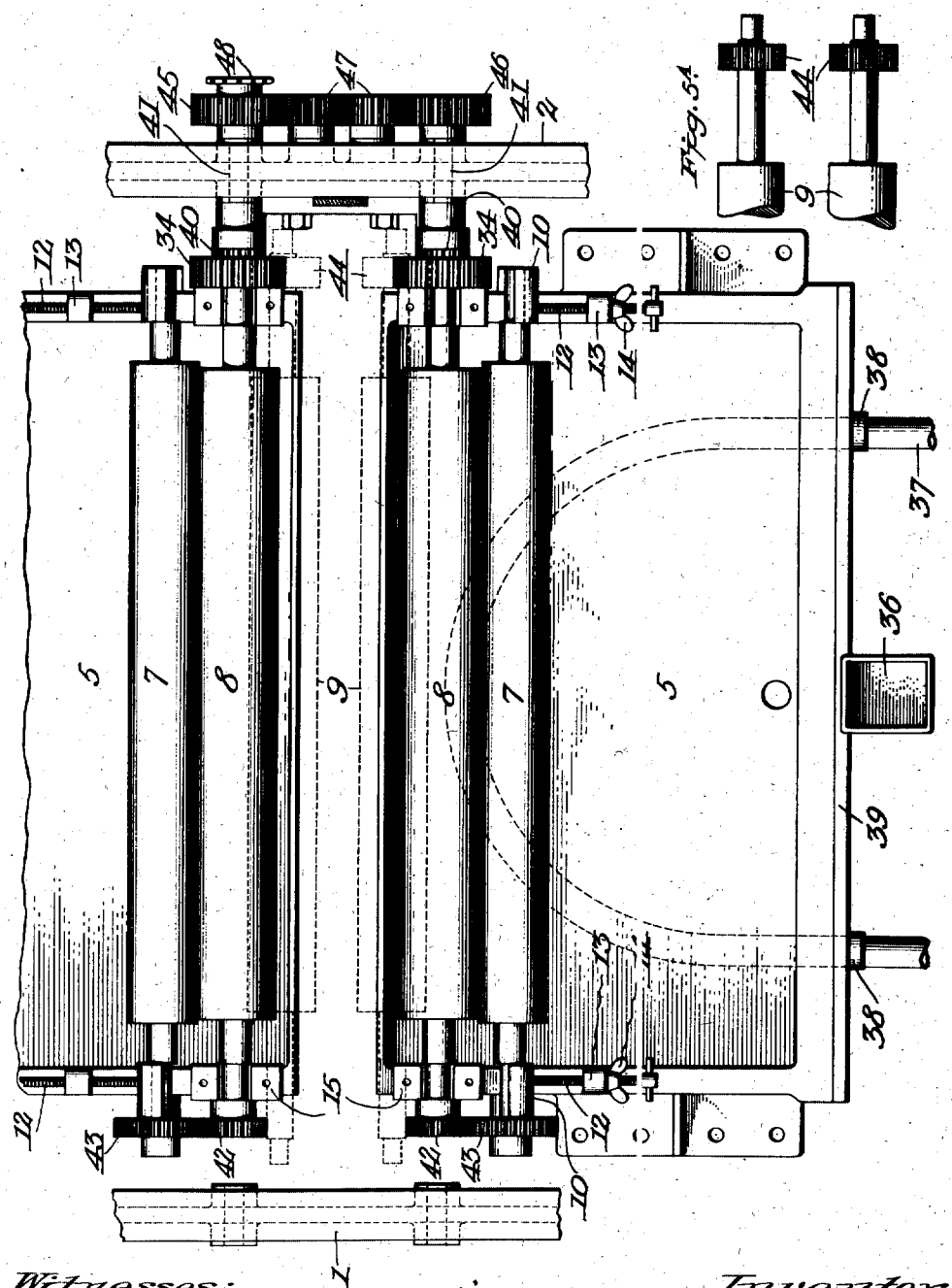

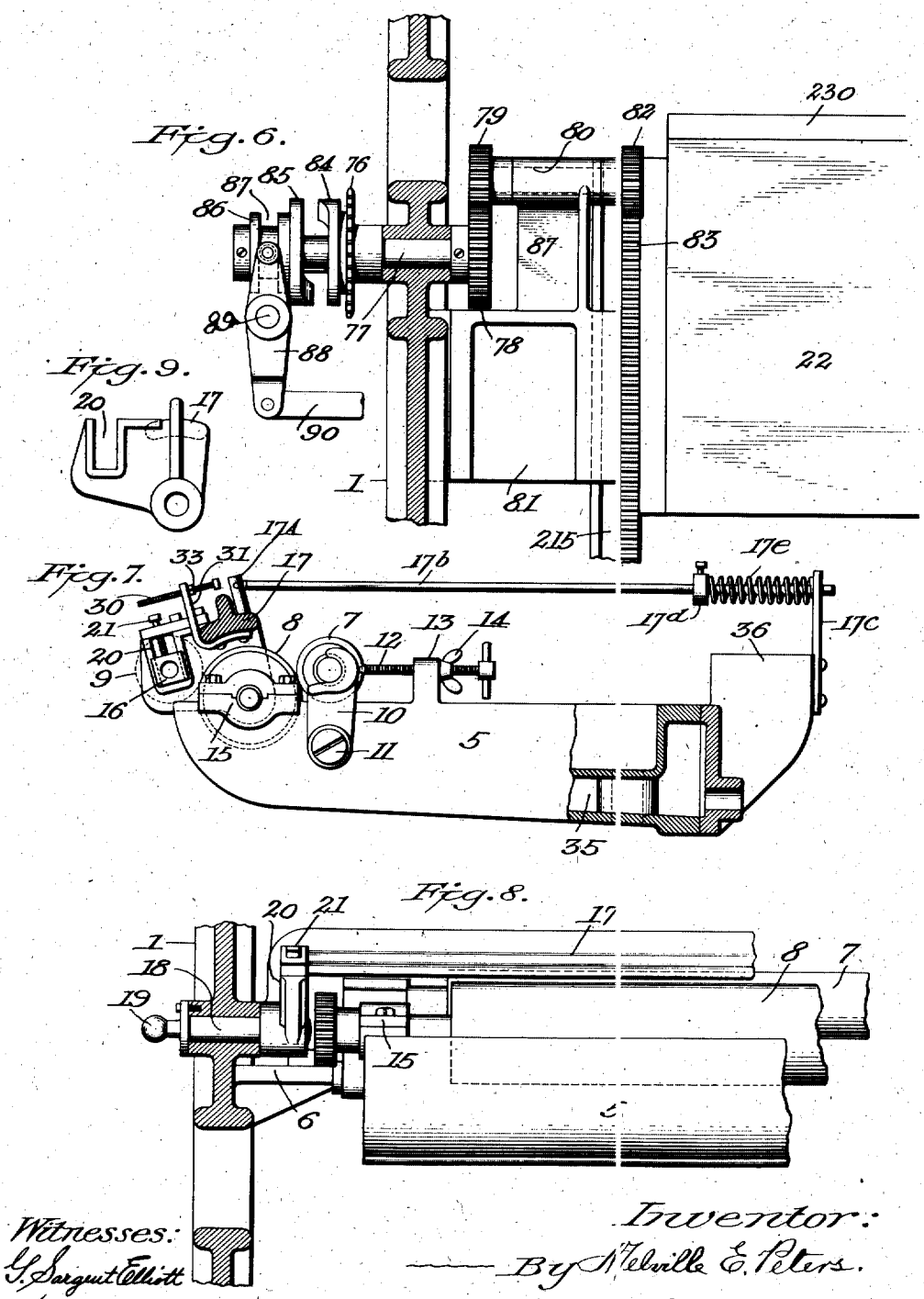

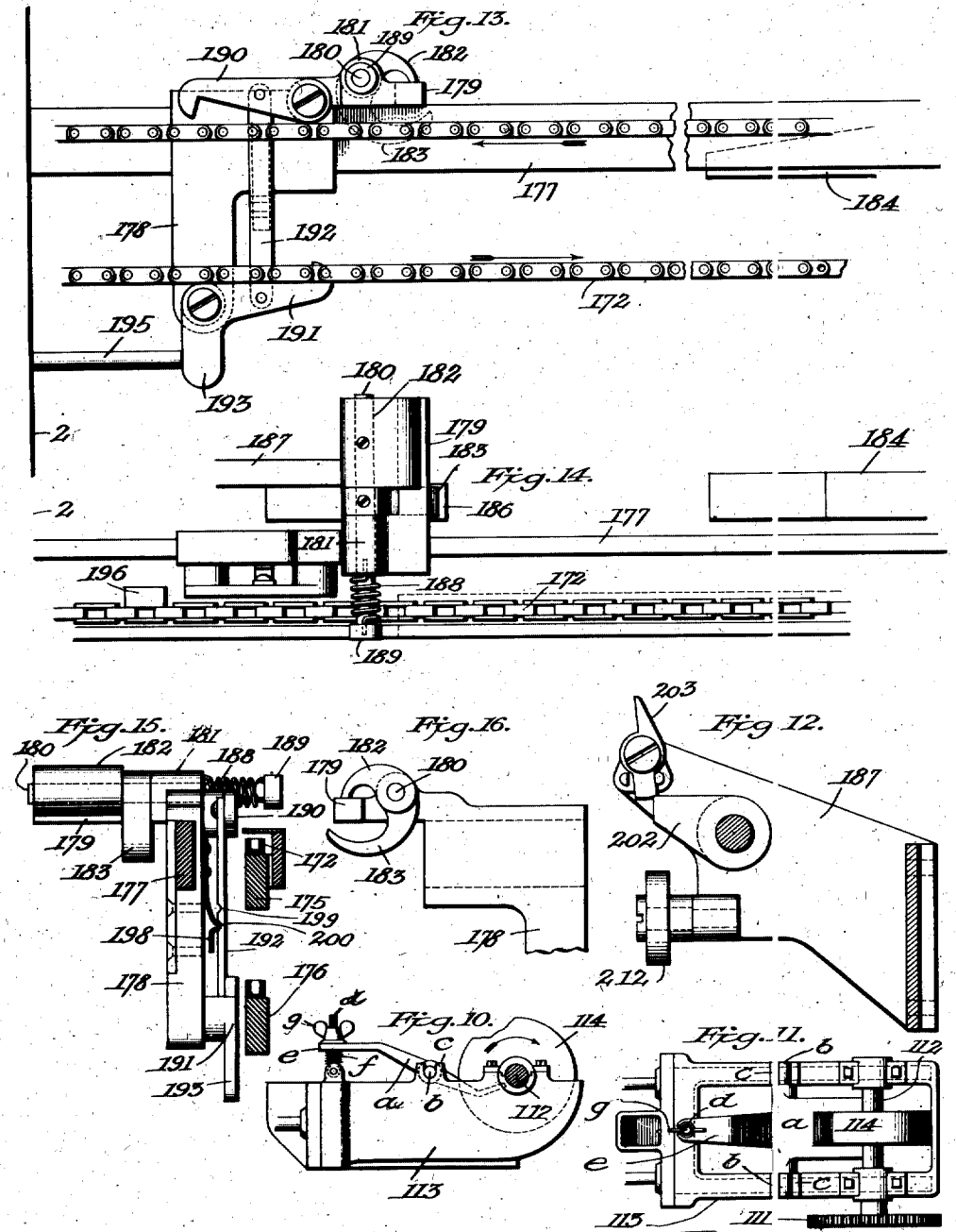

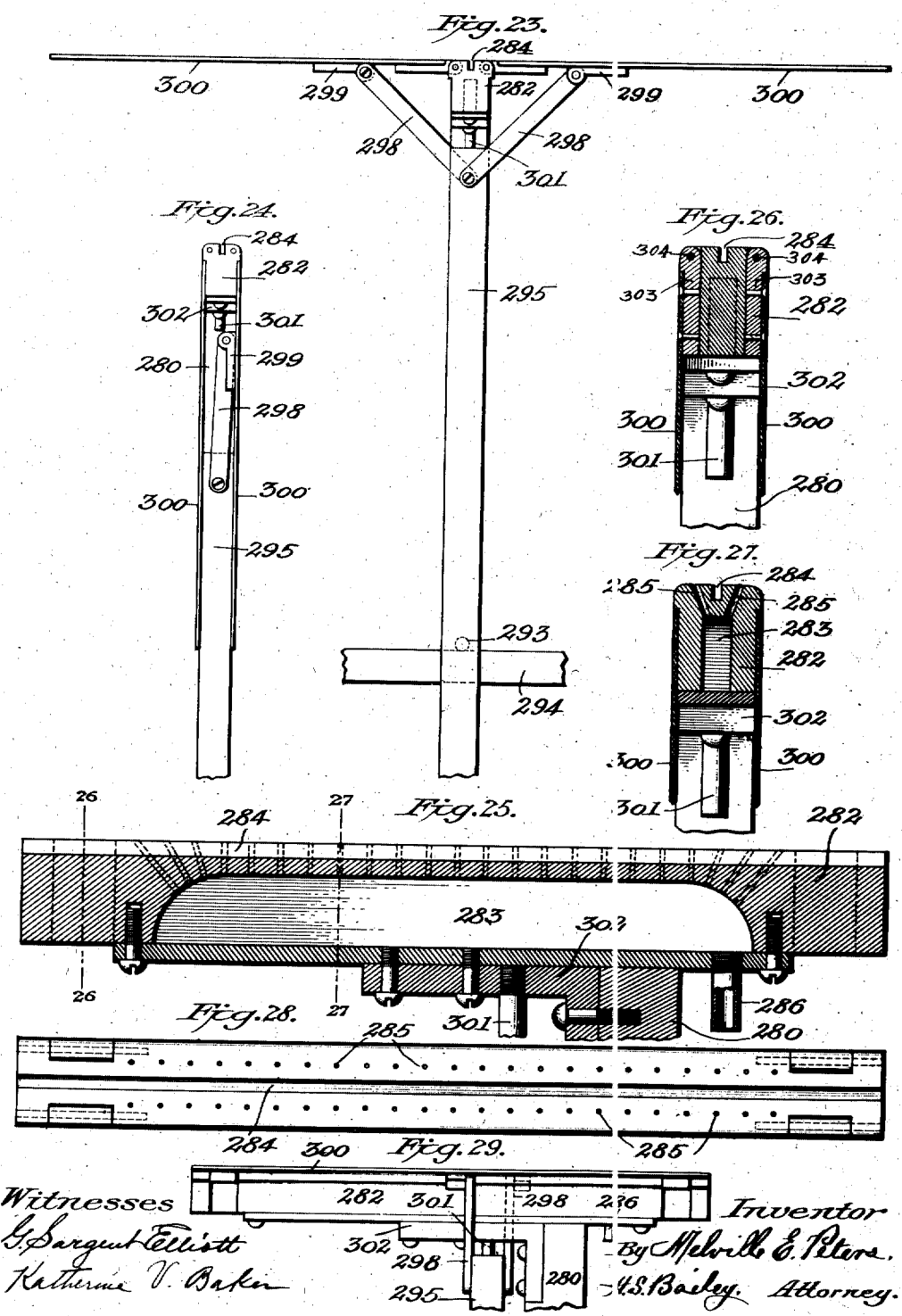

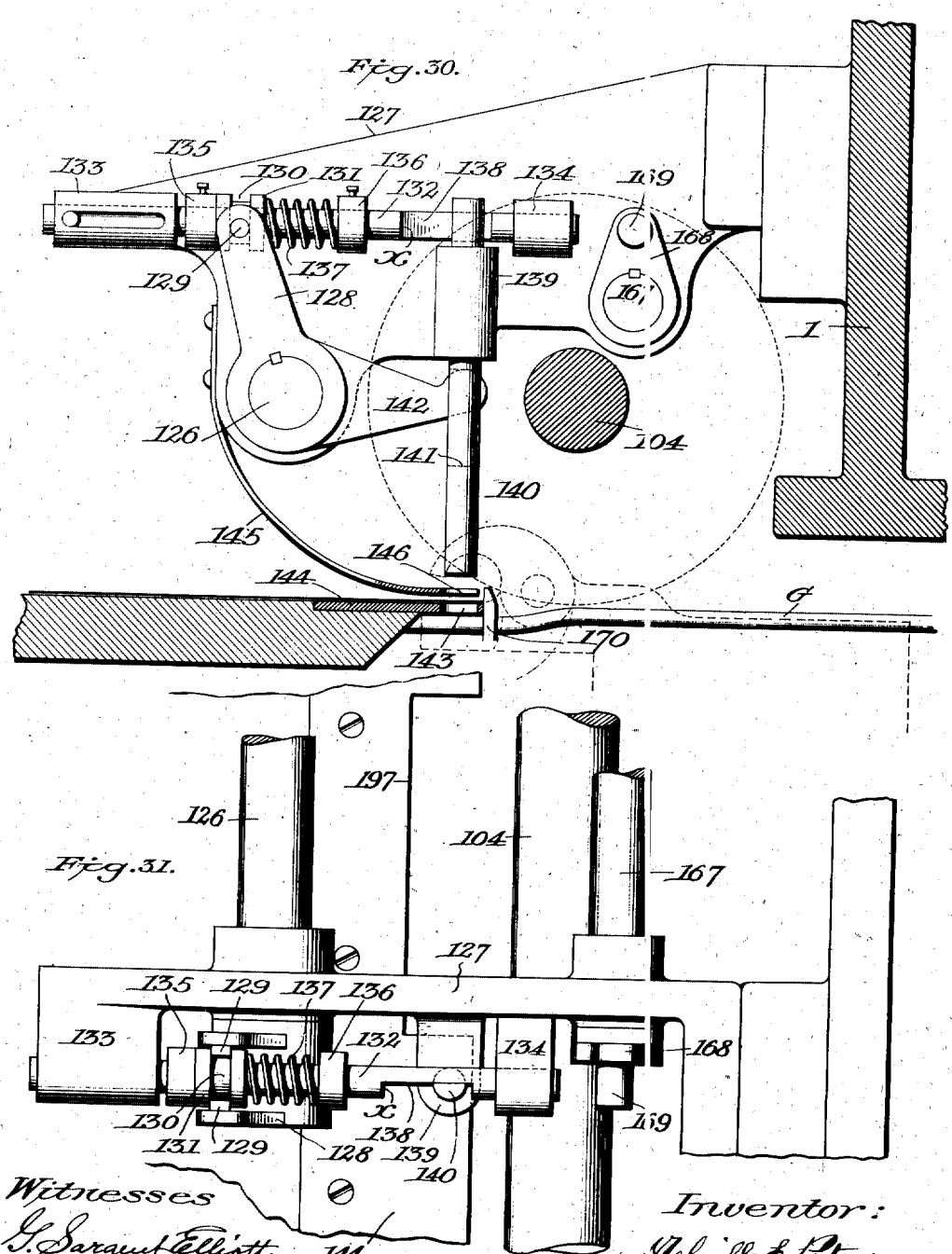

UNITED STATES PATENT OFFICE.

MELVILLE E. PETERS, OF DENVER, COLORADO.

MACHINE FOR GUMMING BLANKS FOR COVERING BOXES AND FOR OTHER PURPOSES.

1,222,983.  Specification of Letters Patent.  Patented Apr. 17, 1917.

Application filed February 23, 1915. Serial No. 10,049.

*To all whom it may concern:*

Be it known that I, MELVILLE E. PETERS, a citizen of the United States of America, residing in the city and county of Denver and State of Colorado, have invented a new and useful Machine for Gumming Blanks for Covering Boxes and for other Purposes, of which the following is a specification.

My invention relates to a new and improved gumming machine for gumming blanks of paper, fabric, leather, and other materials used for outside finishing coverings for paste board boxes and for various other purposes in the box making and in other arts.

My invention, however, has been especially designed to gum paper blanks and blanks of other suitable materials that are used to cover paste board boxes of various kinds and sizes, with the object of giving to the paste board boxes a finished and artistic appearance; and the objects of my invention are:

First. To provide means for completely coating one side of a sheet of paper, fabric, or other material suitable for covering boxes.

Second. To provide means for gumming the entire surface of a blank at one operative gumming cycle movement of the gumming mechanism.

Third. To provide means by which the blanks automatically start the gumming mechanism when they feed in proper relation and position to the gumming mechanism, and that will lock the mechanism and prevent its operating when the paper does not feed into orderly position to the gumming mechanism. And Fourth. To provide means by which blanks after being gummed are spread out flat and straight at the discharge end of the machine.

I attain these objects by the mechanism illustrated in the accompanying drawings, in which:

Figure 1, is a side elevation of the improved blank gumming machine.

Fig. 2, is a front end view thereof, the parts 106 to 117 being omitted.

Fig. 3, is a vertical transverse sectional view on the line 3—3 of Fig. 1, looking in the direction of the arrow, the glue pots and rolls being omitted.

Fig. 4, is a similar sectional view looking in the opposite direction, the glue pots and rolls being shown.

Fig. 5, is a detail plan view showing one of the glue pots and a portion of the other, with the feeding rolls and gearing connected therewith, the distributing rolls being shown in dotted lines.

Fig. 5ª, is a plan view of a portion of the distributing rolls, showing the gears on the shafts thereof.

Fig. 6, is a side view of a portion of the platen showing the mechanism for raising the same.

Fig. 7, is a side view, partly in section, of one of the glue pots, showing the glue roll, the pressure roll, and the frame in which the glue distributing roll is mounted.

Fig. 8, is an end view of a portion of one of the glue pots and its rolls, and also a portion of the frame in which the glue distributing roll is mounted, showing also the manner of pivoting the said frame to the standards of the machine.

Fig. 9, is an end view of the frame in which the glue distributing roll is mounted.

Fig. 10, is a side view of the glue pot for supplying glue to the central portion of the sheet.

Fig. 11, is a plan view thereof.

Fig. 12, is a sectional view of the bracket upon which is mounted the gravity stops which normally lock the platen-operating mechanism.

Fig. 13, is a side view of the sheet carriage and operating chain.

Fig. 14, is a plan view of the same.

Fig. 15, is a rear end view of the carriage, the supporting bars for the same, and for the operating chain, being in section.

Fig. 16, is an opposite side view of a portion of the carriage from that shown in Fig. 13.

Fig. 17, is a side view of a portion of the mechanism, including one of the grippers, for removing the sheets from the platen and conveying them to a spreader, also the supporting bar upon which the said supporting mechanism is slidably mounted.

Fig. 18, is a vertical, transverse sectional view thereof on the line 18—18 of Fig. 17.

Fig. 19, is a side view of the gearing for reciprocating the toothed rack with which the grippers are connected.

Fig. 20, is a front view of the mechanism shown in Fig. 19.

Fig. 21, is a vertical sectional view of one of the blocks in which the gripper fingers are pivotally mounted and a portion of the bar to which it is attached.

Fig. 22, is a plan view of said block.

Fig. 23, is a front view of the spreaders and connected parts which receive the sheets from the platen, the said spreaders being open, or so as to support the sheets in a horizontal position.

Fig. 24, is a front view thereof, the spreaders being closed or folded so as to stand vertical and parallel to each other.

Fig. 25, is a vertical, longitudinal sectional view of the suction box to which the spreaders are hinged.

Fig. 26, is a transverse, sectional view on the line 26—26 of Fig. 25.

Fig. 27, is a similar view on the line 27—27 of Fig. 25.

Fig. 28, is a plan view of the suction box, the spreaders being hinged thereto.

Fig. 29, is a side view of the spreaders and connected parts shown in Fig. 23.

Fig. 30, is a side view of the mechanism for controlling the feed of the blanks or sheets, a portion of the feed table and one of the guides being shown in section.

Fig. 31, is a plan view of the mechanism shown in Fig. 30.

Fig. 32, is a plan view of the system of rolls and gearing by which the central portion of the blanks are glued, as the blanks leave the feed table.

Fig. 33, is a vertical, sectional view of a portion of the upper end of the platen.

Fig. 34, is a plan view of one of the blanks for covering boxes. And

Fig. 35, is a detailed, sectional view through the feed end of the machine.

Fig. 36 is a side view of the power driven shaft and its hand lever operating friction-clutch mechanism for applying motive power to and disconnecting it from the machine.

Fig. 37 is a fragmentary sectional view, illustrating the relation of the blank-stop to the feed table, and its connection with the operating slide bar.

Similar letters of reference refer to similar parts throughout the several views.

Referring to the drawings,—

The numerals 1 and 2 designate the supporting standards of a machine embodying my invention. These standards comprise a pair of castings, each of which rests on a floor or other suitable foundation. These standards are spaced at a sufficient distance apart to receive and to support upon and between them the blank feeding and the blank gumming operating mechanism.

These standards and the blank feeding and gumming operating mechanism upon and between them, form the gumming machine proper of my present invention. It is essential, however, that some means be employed to feed the blanks to my gumming machine. In this respect, however, my invention contemplates broadly the use of any suitable blank feeding machine or device for automatically feeding the paper or other material blanks from a stock of blanks on a table portion or from another machine to my improved gumming machine; and I have illustrated on one end of my blank gumming machine a blank feeding mechanism which I preferably use in connection with my blank gumming machine, and which feeds the blanks to the mechanism that carries them one at a time in successive order in proper relation to the gumming rolls, and which is a necessary part of my gumming machine's mechanism. Likewise it is essential that means be employed to feed blanks after they have received a coating of adhesive gum material, such as glue gum, away from the gumming rolls, and I have illustrated means for feeding the gummed blanks to a predetermining point beyond the gumming rolls, where they may be removed by hand or by automatically operating machinery, which I do not illustrate herein, as it, as well as the particular automatic feeding mechanism I preferably use, will form the subject-matter of separate applications for patents.

The standards 1 and 2 are secured and connected together by cross tie castings 3, which are bolted to the standards near the foot portions 4 thereof. Between the standards I place two gum holding pans 5, which are placed on opposite sides of the longitudinal center of the machine. The inner edges of these glue pots are placed at equal distances from the longitudinal center of the standards, and they extend across between the standards and rest on and are bolted to shelf brackets 6, which are formed on the said standards. Each gum pot is provided with a set of three gumming rolls 7, 8, and 9, the sets of rolls being exactly alike.

The roller 7 of each set of rollers is provided with trunnions that are mounted in open sided journal bearings that are formed in the upper ends of pairs of swinging arms 10, the lower ends of which are pivotally secured to the gum pot, by screws 11, see Fig. 7. These bearing arms 10, with the rollers 7, are adjustable with respect to the rollers 8, by means of threaded rods 12 that are threaded to lugs 13, that are formed on the gum pot, and their inner ends bear against the bearings of the arms 10 and they are held in adjusted positions by butterfly check nuts 14, which are threaded to the rods and are clamped against the lugs 10. The rollers 7 are made adjustable in order to regulate the amount of gum feeding from them onto the rollers 8. The rollers 8 are mounted in fixed capped journal bearings 15, which are formed on the gum pot. The rollers 9 are mounted in adjustable bearings 16, that are formed in swinging yoke shaped frames 17 that are pivotally journaled on trunnion pins 18, which extend through the standards 1 and 2. These pins are provided with finger grasping stems 19, by which they may readily be withdrawn from the apertured ends of the yoke frame, and also from the standards. The journal bearings 16 consist of square blocks that are adjustably mounted in slideways 20, formed in the yoke frame, by means of screws 21, that permit the journal ends of the rollers 9 to be moved and adjusted to cause the rollers 9 to bear evenly and to feed gum evenly to the opposite sides of the blanks, as they are fed upwardly between these rollers 9, by a plunger platen 22.

The normal space between the rolls 9, is the same as the thickness of the platen 22, so that when the platen passes up between them, with a blank folded midway of its area over the edges of the said platen, the vertical portions of said blank, or the outer faces of the parts thereof lying against the sides of the said platen, contact with the rolls 9, and thus receive a coating of gum, which is evenly distributed over the contacting parts of the said blank. As the platen reaches the limit of its upward movement, the frames 17, are swung outward a short distance, so as to move the rolls 9 out of contact with the blank, which is immediately removed from the platen, in a manner to be hereinafter described, and the frames 17, are held in this position until the platen drops to its normal position, and as the rolls 9 are out of contact with the platen, the said platen is prevented from becoming gummed. When the platen passes down and out from between the rolls 9, the frames 17 are permitted to assume their normal positions. The frames 17, are spread or swung apart to clear the platen, by means of a bar 23, which is slidably mounted upon the inner side of the standard 3, (see Fig. 3). The upper end of this bar terminates in a short right angled bend 24, the opposite edges of which are beveled, and when the bar is raised, these beveled edges of the part 24, are forced between the opposing slideway portions 20, of the said frames 17, and the frames are thereby swung on their pivots, to increase the space between the rolls 9. The bar 23 is raised by means of a lever 25, the outer end of which is pivotally attached to the standard 3. About midway of its length, this lever carries a roller 26, which contacts with a cam 27 of suitable contour, which at a proper time rocks the lever 25 so as to raise its inner end which is pivotally connected to the upper end of a short vertical arm 28, the lower end of which is pivotally attached to the lower end of the said lever 23, which is thereby raised in unison with the lever 25. The cam 27, is rigidly mounted on the power shaft 29, of the machine. The rolls 9 are held in their normal positions by screw rods 30, which are threaded to the vertical portions of straps 31, which are secured to the ends of the frames 17, adjacent to the standard 1. The inner ends of these screw rods bear upon the platen guide 32, and are adjusted to give the required space between the rolls 9, the rods being held in their adjusted positions by jam nuts 33, which bear against the straps 31 as will be readily understood by reference to Figs. 4 and 7.

The outward movement of the frames 17 is cushioned in the following manner:

Into the central portion of each frame is screwed a post 17ª, to which is pivotally attached the inner end of a rod 17ᵇ, the outer end of which is slidably mounted in an upright 17ᶜ, secured to the water inlet of the glue pot 5. A collar 17ᵈ, is secured upon the rod by a set screw, a short distance from the upright 17ᶜ, and between the upright and the collar is interposed an expansion coil spring 17ᵉ, which surrounds the said rod. When the frames 17 are thrown apart by end 24 of the bar 23, the shock is absorbed by the springs 17ᵉ, and when the bar 23 is lowered, the springs 17ᵉ press the frames toward each other, until the ends of the rods 30 engage the guide 32 and thus define or limit the inner movements of the frames 17. The trunnion centers of the frames 17 are positioned in axial alinement with the rollers 8, consequently when the rollers 9 swing reciprocally in their operative movement relative to the blank carrying plunger and the blank, they are in gum receiving contact with the rollers 8. The mechanism that reciprocally moves the platen up and down between the rollers 9, will be explained fully hereinafter. The rollers 8 are each rotatively driven by gears 34 on their rear ends, that are driven by a train of gears and sprocket chain driven wheels, which will be presently described. The glue pots 5, are formed with chambers 35, which are provided with a supply of water through inlets 36, and steam is passed through pipes 37, which extend around the chambers 35, their ends passing out through apertures 38 in a removable plate 39 which closes the front ends of the chambers 35. The pipe 37 heats the water, which keeps the liquid glue gum in the glue pot of an even fluidity and of proper temperature, and the pots are kept provided with a supply of glue that partially immerses the rollers 8.

The rollers 8 are set lower in the glue pans than the rollers 7, and pick up the glue and the rollers 7 are rotated slower than the rollers 8 in order that they may have a slipping and scraping effect on the surfaces of the rollers 8, which permits them by adjustment of their screws to scrape off from the rollers 8 as much or as little of the amount of gum that adheres to them as they rotate in the gum, as is desired to supply the rollers 9 to properly and evenly coat the blanks as desired.

The gum rollers 8 of each set are preferably brass rollers and are rotatably driven by pinions 40, which mesh with the gears 34, and are mounted on stub shafts 41 that extend through the frame 2, and on their front ends near the frame 1 they are also provided with gears 42, that mesh with larger gears 43 that are mounted on the front ends of the rollers 7. The rollers 9 are driven by gears 44 that are mounted on their rear ends and mesh with the gears 34, on the rear ends of the rollers 8. Upon the opposite ends of these stub shafts 41, gears 45 and 46 respectively are secured. These gears 45 and 46 are operated by two idler gears 47, which are mounted on pins that are secured to the frame 2, the gears 47 being in mesh with each other and with the gears 45 and 46 respectively. The gear 45 is driven by a sprocket wheel 48, that is secured on a hub portion that extends from it, and this sprocket wheel 48 is driven by a sprocket chain 49, that extends from it to a sprocket wheel 50, that is mounted on a shaft 51, which I term the supplementary driving shaft, which is rotatably mounted in bearings 52 that are formed on the frames 1 and 2. This shaft 51 is driven from the clutch controlled main driving shaft 29, as will be presently described. Proper rotative motion is transmitted from the gear 40 to the gears 34 and 44 through the medium of the idler gears 47, which are of the same size. The gears 44 are consequently rotated at the same speed and drive their roller 9 in the same direction as the gears 45 and 46 respectively.

The gumming machine's supporting frame is extended beyond the standard 2, by upper and lower cross ties 53 and rear end standards 54. A power driven shaft 55 is journaled in boxes 56, at the rear end of the machine, and carries a worm pinion 57, which meshes with a worm gear 58, on the driving shaft 29. This driving shaft is arranged parallel with the sides of the frames and at right angles to the longitudinal length or axis of the gumming machine.

The shaft 55 is provided with a spring controlled friction clutch 59 and operating lever 60, the clutch being arranged to always be in closed friction gripping condition, except when it is forcibly held in an unclutched condition by moving the operating lever to unclutch it.

The inner end of the shaft 55 terminates in a square wrench receiving portion, to which a wrench may be applied to turn the machine's mechanism to see that all parts work in unison before applying steady power to it. This shaft carries a gear 61, which meshes with a gear 62 that is rotatably mounted on a stub shaft 63 that is secured to an angular bracket 64, that is secured to the standard 54. A bevel gear 65 is also mounted on this stub shaft, and this bevel gear meshes with a bevel gear 66 that is mounted on a stub shaft 67 that is secured to the angled end of the bracket 64. A sprocket wheel 68 is secured to the side of the bevel gear 66, and a sprocket chain 69 connects this sprocket wheel 68 with a sprocket wheel 70 that is mounted on the shaft 51.

The clutch 59 is provided with a belt receiving pulley portion 71, by which it may be driven by a connection with a pulley on a motor driven shaft. My invention contemplates any other arrangement of power connections and transmitting members that may form parts of or be connected to either the auxiliary or supplementary shafts.

The blanks A are cut out of sheets of paper, fabric, or other suitable material in squares, from which the corners are cut away in such a manner as to leave the opposite ends B entirely free from the sides C, and the opposite sides free from the ends, as shown in Fig. 34. These blanks are placed in bundles, or stacks, on a table 72, from which they are fed either by hand or by suitable blank feeding mechanism attached to this machine, which I do not illustrate, or by a separate machine if desired, as my invention contemplates any type or character of blank feeding mechanism and two different types of blank feeding mechanism are shown herein.

My improved gumming machine contemplates the employment of any suitable means for feeding blanks to it, and the particular automatically operating blank feeding mechanism I preferably employ for feeding the blanks I do not illustrate, as I expect to embody it in a separate application for a patent. In the present instance, the blanks are fed one at a time from the table by an attendant, so as to be gripped and fed into the gumming machine by its automatically operating blank feeding mechanism, one arrangement of which is constructed and arranged as follows:

The supplementary shaft 51 extends to and beyond the standard 1, to which it is journaled by the box 52, and on its end portion a sprocket wheel 73 and also a bevel gear 74 are secured. A sprocket chain 75 extends from the sprocket wheel 73 to a sprocket wheel 76 which is loosely mounted on a stub shaft 77, that is journaled in the frame 1, and extends through it to its opposite side far enough to receive on its end a gear 78, which meshes with a gear 79, that is mounted on a stub shaft 80 that is journaled in a bracket 81 that is secured to the frame 1. Upon the opposite end of the stub shaft I secure a gear 82 which meshes with a vertically positioned toothed rack 83 that is secured to the adjacent side of the plunger platen 22, which is positioned and adapted to carry the blanks up through and between the gumming rolls 9, as will be presently described.

A coöperating disk 84 of a clutch is secured or formed on the outside of the sprocket wheel 76, and on the stub shaft 77 the other part 85 of this clutch is slidably mounted. The sliding half 85 of this clutch is feather-keyed to the shaft 77, and is provided with a hub 86 in which a groove 87 is formed, in which inwardly angled ends of the yoke portion of a rock lever 88 fit loosely. This rock arm is supported intermediate of its ends by a bracket 89, that is secured to the frame 1. The lower end of this rock arm 88 is pivotally secured to one end of a connecting rod 90 which extends forward and connects to a lever 91 that is secured to a short shaft 92, that extends at right angles to the supplementary shaft 51. The object of the levers 88 and 91 and the connecting rod 90 will be explained hereinafter.

The bevel gear 74 meshes with a bevel gear 93, that is supported on a stub shaft that is secured to a bracket 94 which is bolted to the standard 1. A gear 95 is rigidly secured on the stub shaft with the bevel gear 93 and meshes with an idler gear 96, which is mounted on a pin that is secured to the bracket 94. The gear 96 meshes with a gear 97 that is secured on the adjacent end of a shaft 98, the opposite end of which is journaled in a bracket 99, which is secured adjacent to the opposite edge of the standard 1 from the bracket 94. Adjoining the gear 97 is a gear 100 on the shaft 98, which meshes with an idle gear 101, which in turn meshes with a similar idle gear 102, which latter gear meshes with a gear 103, on the adjacent end of a shaft 104, which is journaled in the brackets 94 and 99.

The gear wheel 103, meshes with a gear wheel 105 on a shaft 106, the outer end of which is journaled in the bracket 94 while its inner end is mounted in a bracket 107, which is secured to the standard 1, about midway between the brackets 94 and 99.

The shaft 106, carries a gear wheel 108, which meshes with a gear wheel 109, on a stub shaft 110, journaled in the bracket 107, and the gear wheel 109 meshes with a gear wheel 111, on a shaft 112, which is mounted in bearings on the side edges of a glue pot 113, which is suitably supported above the feed table and in direct line with the path of the platen 22, the shaft 112, carries a resilient roller 114, preferably rubber, the diameter of which corresponds to the pitch diameter of the gear wheel 111, and is adapted to convey liquid glue from the pot 113, to a similar roller 115, on the shaft 110, and the roller 115, contacts with a roller 116 on the shaft 106, and the roller 116, contacts with a roller 117, on the shaft 104, the arrangement of the gearing being such that the glue pot roller 114 turns in the direction of the arrow, Fig. 10, while roller 117, the function of which is to supply a coating of glue to the central longitudinal portion of a blank, turns in the opposite direction, or in the direction which feeds the blanks into the machine, the diameter of the roller 117 being such that it contacts with the blanks as they are drawn from the feed table into the machine, in a manner to be hereinafter described.

The glue pot 113, carries a scraper $a$, having central lateral trunnions $b$, which rest in bearings $c$, on the sides of the pot. The forward end of the scraper is bifurcated and straddles the roller 114, and the transverse edge of the bifurcated portion is adapted to regulate the supply of glue furnished by the said roller. A screw $d$, is pivotally connected at its lower end to the rear end of the pot, and passes through a recess in the tail end $e$, of the scraper. A coil spring $f$, encircles the screw between the tail and the part to which the screw is pivoted, and exerts an upward pressure on the tail, and a thumb screw $g$, is threaded upon the upper end of the screw and bears upon the tail, whereby the scraper could be adjusted with respect to the roller, to regulate the amount of glue furnished by said roller.

The feeding of the blanks, whether effected manually or by automatically operated mechanism, is so controlled that a blank cannot pass from the feed table into the machine, after the gripper, which is adapted to carry the blanks to a position immediately above the platen 22, has started on its forward movement. The mechanism for accomplishing this as well as other operations connected with the feeding of the blanks to the machine, is arranged and constructed as follows: On the forward end of the shaft 29, are secured two cams 118 and 119. The outer cam 118 is arranged to rock a lever 120, which is rigidly secured upon a transverse shaft 121, which is mounted in bearings 122, on the standard 1. The opposite end of the shaft 121, from the lever 120 carries a short lever 123, to which is pivotally attached one end of a connecting rod 124, the opposite end of which connects with a short lever 125, on the end of a shaft 126, which is supported adjoining the lever 125 in the bracket 99, and at its opposite end in a bracket 127, which is bolted to the standard 1. The inner end of this shaft, or that end supported in the bracket 127, carries a bifurcated lever 128, the ends of which carry opposing pins, or projections 129 which enter an annular groove 130, in a collar 131, which is slidably mounted on a rod 132, which is slidably mounted in bearings 133, and 134, on the bracket 127. Collars 135 and 136 are secured upon the rod 132, the former acting as an abutment for the slidable collar 131, while the latter acts as an abutment for one end of a coil spring 137, which surrounds the stem and is interposed between the said slidable collar 131, and the fixed collar 136.

A recess 138, of suitable length, is formed in the rod 132, of a depth equal to one-half of its diameter, the recess being positioned between the collar 136, and the bearing 134.

A vertical bearing 139, is formed on the bracket 127, which bearing extends beneath the rod 132, where the recess 138 occurs. A rod 140, is slidably mounted in the bearing 139, the axial center of said rod being in line with the axial center of the rod 132, the rods being at right angles to each other.

The upper portion of this rod 140 is recessed for a suitable distance from its end to a depth equal to one-half of its diameter, and the flat face of this recessed portion bears against the corresponding flat face of the recess 138, in the rod 132.

A recess 141, is formed in the central portion of the rod 140, similar to the recess 138 in the rod 132, and the upper shoulder of this recess normally rests upon the end of a tail 142, which extends from the hub of the bifurcated lever 128, and normally supports the rod 140 in its bearing 139, with its lower end slightly above the feed table 72, and in line with a hole 143, in a metal strip 144, which is secured to the forward end of the feed table, approximately half of its width extending beyond the edge of the said table. A curved paper guide 145, is secured at one end to the bracket 127, and its opposite end passes under the lower end of the rod 140, and far enough above the strip 144, to permit the blanks to be freely fed between the said guide and the table, the free end of the guide having a recess 146, in line with the rod 140, and hole 143. The functions of the rod 140 will be hereinafter explained.

Centrally of the width of the standard 1, and on the outer face thereof, is suitably secured a vertical guide bar 147, in which is slidably mounted a bar 148, the upper end of which extends above the guide and is T-shaped; the lower end of the bar 148, carries a pin 149, which projects through a vertical slot 150, in the guide and to which the upper end of a link 151, is secured. The lower end of this link is pivotally connected to one end of a rock lever 152, which is mounted centrally of its length upon the standard 1. The opposite end of this lever carries a roller which engages the circumferential edge of the cam 119, the cam being adapted to normally depress the roller end of the rock lever and having a depressed portion 153, which at a predetermined time permits the said roller end to rise, a spring 154 being connected with the link 151, and with the floor or foundation upon which the machine rests, which exerts a continuous downward pull upon the link and bar 148, and likewise upon that end of the lever 152, to which the link is attached. The T-portion of the bar 148 extends in the direction of the length of the machine, and to its inner end is pivotally attached one end of a link 155, the opposite end of which is connected to the inner end of a horizontally disposed rock lever 156, the opposite end of which carries a roller 157, which is in line with the glue roller 117, and normally separated from the same by a slight space. When the cam 119, permits the bar 148 to be depressed by the spring 154, the link 155, rocks the lever 156, and the roller 157 is raised and acts to press a blank passing between it and the glue roller 117, in contact with the said glue roller, the said cam 119, reversing the movement of the bar 148, and consequently rocking the lever 156, to lower the roller 157, as the blank passes beyond the same, thereby to prevent the said roller 157 from contacting with the glue roller 117.

The upper portion of the bar 148, is provided with a hole 158, which normally registers with a corresponding hole 159, in the guide bar 147. A pin 160, extends into the hole 159, and its outer end is pivotally connected to a short lever 161, which is secured upon one end of a shaft 162, which is mounted in bearings 163, on the standard 1. To the other end of this shaft is secured a horizontally disposed rod 164, to which the lower end of a connecting rod 165, is attached. The upper end of the rod 165, connects with a short lever 166, on the end of a shaft 167, which is mounted in bearings in the brackets 99 and 127. The end of the shaft 167, which is mounted in the bracket 127, carries a short arm 168, having a horizontally disposed pin 169 in horizontal line with the adjacent end of the rod 132. The outer end of the T-portion of the bar 148, carries a stop plate 170, which, when the said bar is in its elevated position, projects slightly above the forward edge of the feed table, as shown in Fig. 37, in position to engage the forward edges of blanks as they are passed beneath the guide 145 in position to be gripped and carried forward into the machine, the said stop plate being depressed by the downward movement of the bar 148, as the blank is gripped, thus permitting the said blank to be carried forward.

Upon each rotation of the cam 118, the lever 120 and the shaft 121, are rocked and the connecting arm 124 which is operated by the said shaft 121, rocks the shaft 126, carrying the bifurcated lever 128, which slides the rod 132.

Prior to each sliding movement of the rod 132, a blank is passed forward against the stop 170, and as the lever 128 is rocked by its shaft 126, the tail 142 of said lever permits the pin 140 to drop but the pin is stopped by the portion of the blank which covers the hole 143 in the table, and as a result, the upper end of the pin, which engages the flat face of the recess 138, in the pin 132, is engaged by the approaching shoulder $x$, of the said recess in the said pin 132, which is slid forward by the lever 128, engaging the annularly grooved collar 131, on the said rod, and further forward movement of the rod is thereby prevented, and the complete movement of the lever 128, is permitted by the sliding of the collar 131 on the rod 132, against the action of the spring 137, which restores the said collar to its normal position as the movement of the lever 128 is reversed, and the rod 140, is lifted to its normal position by the tail 142.

If, however, no blank is fed in against the stop 170, the rocking of the lever 128 permits the rod 140 to drop down until its lower end passes through the hole 143, in the feed table when its upper end is below the path of the shoulder $x$, of the recess in the rod 132, and the said rod 132, is carried forward until its end engages the pin 169, in the arm 168, on the shaft 167, which is thus rocked, the spring 137 being strong enough to withstand the thrust. The rocking of the shaft 167, raises the connecting arm 165, which, through the medium of the rod 164, rocks the shaft 162, and its lever 161. The pin 160, connected with the lever 161, is thereby slid into the hole 158, of the bar 148, and downward movement of the said bar, under the tension of the spring 154, is prevented, and the roller 157, is thus prevented from contacting with the glue roller 117, which would otherwise be the case.

The blanks are carried forward to a position above the platen 22, in the following manner:

The shaft 98, carries a sprocket wheel 171, which is connected by a sprocket chain 172, with a sprocket wheel 173, which is carried by a shaft mounted in suitable bearings 174, on the standard 2. Horizontal bars 175 and 176, which are secured at their ends to the standards 1 and 2, support the upper and lower laps of the chain so as to prevent sagging of the same. Another horizontal bar 177, extends parallel with the bar 175, and a short distance from the inner side of the same, and is also secured at its ends to the standards 1 and 2, in any suitable manner. Upon the bar 177, is slidably mounted a carriage in the form of a vertically disposed portion 178, through which the bar passes, and a horizontally disposed portion 179, which extends inward from the vertical portion, and forms the stationary member of a gripper, the upper face of this member being on the same plane as the upper face of the feed table. A rod 180, passes through a bearing 181, on the carriage, upon the inner portion of which is rigidly secured the movable jaw 182, of the gripper, which comprises a hub through which the rod passes, and a horizontally disposed curved portion which terminates in a flat gripping edge, which is arranged to rest squarely upon the stationary jaw 179. Rigidly mounted on the rod 180, between the jaw 182, and the bearing 181, is a cam 183, of the form shown in Fig. 16, which is designed to engage the inclined face of a block 184, carried by an arm 185, which is secured to the rear end of the T-portion of the bar 148, when the carriage is in its blank gripping position, whereby the jaw 182 is swung away from the jaw 179, in order to receive a blank, the said cam being also arranged to engage the inclined face of a block 186, carried by a bracket 187, to be presently described—by which the jaw 182, is again opened to release the blank. A coil spring 188, encircles the outer portion of the rod 180, and one end of the spring is inserted in a hole in the carriage, while its other end is inserted in a hole in nut 189, which is screwed upon the end of the rod, the tension under which the spring is held, serving to hold the gripper jaw firmly against this stationary jaw, when not in engagement with either of the cam-engaging blocks. The carriage is moved to its blank-gripping, and blank-releasing positions in the following manner:

Upon the upper end of the outer face of the carriage is pivotally secured a hook arm 190, the hook end of which is forward of its pivotal end, the hook extending downward from the arm. At the lower end of the vertical portion of the carriage, a hook arm 191, is pivotally secured, its hook end being rearward of its pivotal end, the hook extending upward from the arm. Each of the hook arms have extended hubs, which space the hook arms from the side of the carriage.

These arms are connected by a vertical link 192, and the lower arm 191, has a depending tail 193, extending from its hub portion, which is adapted to engage a stop pin 194, at the blank gripping position of the carriage, and a stop pin 195 at the blank releasing position of the carriage. One link of the chain 172, is provided with a laterally projecting lug 196, which is adapted to engage the hook of the arm 190, to move the carriage forward, and the hook of the arm 191, to move the carriage rearward.

When the carriage with a blank reaches the limit of its forward movement, the tail 193, engages the stop pin 195, and the hook arm 191, is thrown up in position to be engaged by the lug 196, when it shall have reached that point, and simultaneously the hook arm 190, is also lifted and thereby disengaged from the said lug. The gripper at the same time releases the blank, which is carried up between the gluing rollers 9, in a manner to be presently described, and the carriage remains at a standstill until the lug 196, travels around and engages the hook 191, whereby the carriage is returned to the feed table, and enters a recess 197, in the adjacent edge of the metal strip 144, on the front edge of the same, in which position the stationary jaw 179, of the gripper lies directly beneath the forward edge of a blank, the movable jaw 182, having been opened by engagement of the cam 183, with the cam block 184. As the carriage reaches this position, the hook 191, is released from the chain by engagement of the tail 193, with the stop pin 194, and the carriage remains at a standstill until the lug 196, travels around into engagement with the hook arm 190, when the former operation is repeated, the cam block 184, having been lowered by the downward movement of the bar 148, which permitted the gripping jaw 182, to clamp the blank between it and the jaw 179. The hook arms are prevented from becoming accidentally detached from the lug 196, by a spring dog 198, which is secured at one end to the carriage, and which has a projection which enters horizontal grooves 199 and 200 in the link 192, to lock either one or the other of the hook arms in engagement with the said lug.

As each blank reaches the limit of its forward movement, it contacts with pivoted dogs, which release mechanism that operates the platen 22, which engages the blank centrally of its width, and carries it up through the gumming rolls 9, the said dogs acting to lock the blank-lifting mechanism, when for any cause a blank has not been fed into the machine. This mechanism is arranged as follows:

The bracket 187 is bolted upon the upper portion of the standard 2 centrally of its width, and comprises a body portion from which project parallel members having bearings through which the shaft 92 passes, and is supported at one end, its other end being supported in a bearing bracket 201, which is bolted to the standard 2. Between the projecting members of the bracket, and rigidly mounted on the shaft 92, are two short arms 202, which normally stand in a horizontal position and their forward ends engage the lower ends of dogs 203, which are pivotally connected to the forward ends of the parallel members of the said bracket 187. The dogs 203, are pivoted centrally of their lengths, their upper portions being in the form of fingers against which the forward edges of the blanks strike, as they reach the limit of their forward movement. The lower ends of the dogs are weighted, or made heavy enough to cause the dogs to hang in a substantially vertical line the dogs being arranged to be tilted or swung by a very slight pressure upon their upper ends. By reference to Fig. 12, it will be seen that the lower ends of the dogs engage the forward ends of the arms 202, and thus engaged the shaft 92, is locked against rotation, but when the dogs are tilted by the forward movement of a blank, the arms 202, are released, thus permitting the shaft to be partially rotated, and when the shafts turn, the lever 91 thereon is also turned, and the connecting rod 90, which is operated thereby, rocks the lever 88, at the forward end of the machine, which slides the member 85 of the clutch, into engagement with the member 84, which is loosely mounted on the shaft 77, the disk 85 being feather keyed thereto. The clutch disk 84, rotates continuously through its connection with the sprocket wheel 73, on the shaft 51, the said sprocket wheel being connected by a chain 75, with the sprocket wheel 76, on the said shaft 77.

Thus, when the shaft 77, rotates, the gear 78, on the end thereof, turns the gear 79, on the shaft 80, upon the forward end of which is the gear wheel 82, which meshes with the toothed rack 83, on the rear end of the platen 22, and the platen is thereby lifted, carrying the blank up with it.

The shaft 92 is operated by a cam 204, on the shaft 29, which is provided with a groove of suitable outline into which extends a roller 205, on a vertical lever 206, the lower end of which is bifurcated, and straddles the shaft 29. A rod 207, is slidably secured at one end in the upper end of this cam lever, the side of which is provided with a slot and a pin 208 is extended through the slot and the lower end of the rod, and is arranged to slidably hold the rod in the cam lever. The upper end of this rod is pivotally secured to the end of a lever 209, the opposite end of which is secured to the shaft 92. Upon the rod 207 an expansion spring 210 is mounted loosely and bears at one end against the upper end of the lever and at its other end against a collar 211, which is adjustably secured on the rod by a set screw. The auxiliary shaft and the cam 204 being rotated steadily when the machine is running and being timed to act in proper relation to the blank feeding rollers and the belts, move the lever 206 upwardly and the rod 207 and lever 209 impart a short partial rotative movement to the shaft 92, providing that the blank that is now in the machine on the belts, struck the dogs 203 and moved their upper end back and their lower weighted ends forward enough to clear the ends of the arms 202, which the blank always does when it strikes these pins squarely, and this short partial rotative movement of this shaft and the lever 91 moves the connecting rod to throw in the clutch part 85 and operates the gears above mentioned to raise the plunger on the up-stroke of its reciprocal movement.

When, however, a blank reaches the limit of its forward movement in such a crooked or canted or twisted condition from any cause whatever as to only strike against one of the dogs 203, the other dog that the edge of the blank does not strike, will still block the end of its coöperating lever 202 of the shaft 92, and the plunger operating mechanism is not released, and the platens will not move up, although the cam and its cam lever reciprocate as the auxiliary shaft 29 rotates, and as the cam rotates, its cam lever moves upward but has to slide on its rod 207, thereby compressing the spring 210 as the shaft 92 is blocked by the dogs 203, and the cam lever cannot move it.

The plunger starts on the upward stroke of its reciprocal movement, and its guideway bar travels in the slots of the brackets 32, and 81, at its front end and between the rollers 212 at its rear end, which are mounted on the bracket 187, and as it moves upward it strikes the blank that is resting on supporting rods G upon which it slides centrally of its area between its edges, and as it moves upward between the rollers the blank folds against the sides of the platen and the platen carries it up between the rollers 9, which press flat against it as it passes between them, and leave its surfaces that rest against the sides of the platen smooth and evenly coated with gum, the central portion of the blank, or that part resting upon the edge of the platen having been given a coating of glue by roller 117, as the blank started on its forward movement.

The plunger or platen 22 consists of a board of wood or other suitable material which is slidably and reciprocally mounted between the frames 1 and 2, and up and down between the gumming rollers 9. The back edge of this plunger or platen has a steel guide and supporting bar 213 that fits over and is secured to its edge and adjacent sides and that is secured to it. This guide and supporting bar extend quite a distance below the lower edge of the platen, and a bracing strip 214 is extended from its lower end to the bottom edge of the plunger platen, and is secured tightly to both the guide strip and the plunger. The toothed rack bar 83 before mentioned, is formed in the side of this plunger supporting and guide bar, and meshes with the gear 82 before mentioned that forms a part of the plunger's reciprocating mechanism This plunger supporting guide bar is provided with oppositely arranged vertical grooves 215 that fit over slideways formed in the edge of the bracket 81 which supports the gears 79 and 82. Above this bracket, there is another bracket 216 that is secured to the standard 1, and that is provided with a T slot and to this bracket are secured the upper ends of spaced steel strips 32. These steel strips extend below the casting and their lower ends are secured to a similar bracket 217 that is secured to the frame, and in the outer end of which a similar T slot is formed. These brackets and the slideway strips, I term the plunger's upper guideway. This upper T slot guideway receives the plunger's supporting guide bar. The lower end of the plunger's supporting guide bar is provided with a disk 218 that fits snugly into a dash pot cylinder 219 that is provided with an air vent aperture 220. This dash pot is secured to the floor or foundation that the machine is on, which acts to automatically air-cushion the plunger on its downward stroke.

The opposite end of the plunger platen is provided with a steel bar 221, that is secured along and to its edge. The opposite sides of this guide bar are machined and form guideways for the guide rollers 212 that are rotatably supported in lug portions of the bracket 187.

The opposite sides of this blank moving platen may, if desired, be covered with a cushioning material, preferably with a sheet of rubber. It is essential that the platen on its upper stroke travel to exactly the same point in order to bring the blank in position to be gripped and conveyed to a spreader, in a manner to be presently described, and while the mechanism that reciprocates the plunger does this, yet inasmuch as there might be a little lost motion, owing to the several parts that coöperatively work together to raise the platen, I have, in order to insure a positive and definite upward stroke of the platen to a predetermined point, provided an auxiliary lifting mechanism that engages the plunger at the end portion of its upward stroke, and carries it positively to the same point at each and every one of its upward stroke movements. This mechanism is as follows:

On the auxiliary shaft 29 adjacent to the frame 1, I place and secure a cam 222, the peripheral edge of which forms a cam surface. Adjacent to this cam I secure to the central portion of the frame 1, a rock arm 223 by a stub pin One end of this rock arm is provided with a roller 224 that bears on the peripheral surface, the opposite end of this lever extending toward the opposite side of the machine and connecting to one end of an upwardly extending lever 225, the opposite end of which is pivotally secured to one end of a rock arm 226, that is provided with a hub portion that is secured on a stub pin that is secured to the frame. The opposite end of the arm 226, is in the form of a curved pawl, which terminates in a turned up end which is arranged and adapted to engage a lug 228, that is adjustably secured to the adjacent side of the rock and slideway bar 213, of the platen. A contraction spring 229, is secured to the lever 225, of the rock arm and the opposite end of this spring is secured to a pin that is attached to the frame 1. This spring always holds the outer end of the pawl lug at the lower end of its downward stroke, and when the platen rises on its up stroke the pawl is moved up under the lug 228 and against it, and the actuating cam 222 forces it to lift and carry the platen up with a positive stroke movement to the predetermined point where the central strip of the blank that rested on the top edge of the platen is in position to be gripped and conveyed away from the edge of the platen, and spread out flat and in this flattened out position with one side evenly and wholly covered with a coat of gum, be discharged from my improved gumming machine onto mechanism that will feed it to a box covering machine, which I do not illustrate.

Upon the upper edge of the platen 22, is secured a suction box 230, comprising a hollow longitudinal metal member, the upper edge of which is provided with a groove 231, throughout its length. On each side of this groove, there is a row of small holes 232, which form a communication between the chamber 233, and the atmosphere, a tube 234, connects with the chamber and extends down through the platen and to its lower end, is secured one end of a flexible rubber tube 235, the other end of which connects with a vacuum pump 236, in the form of a cylinder, having a piston to which is secured a rod 237, which connects with one end of a lever 238, the other end of which is pivotally connected to a support 239, attached to one of the side members 53, of the frame. The lever 238, is operated by a suitable cam 240, on the shaft 29, which is arranged to raise the lever, and likewise the pump piston, at a predetermined time, whereby, the suction which is communicated to the box 230, causes the blank to tightly adhere to the top edge of the said suction box as the same is brought into contact with the said blank by the upward movement of the platen, and the blank is thereby held against accidental movement or displacement while being moved up between the rollers 9. The reverse movement of the lever 238, at the proper instant, destroys the vacuum in the suction box, and the blank is released.

The blanks are removed from the platen, and carried forward in a folded condition, to a spreader, by mechanism which I will now proceed to describe.

The cam 222, on the shaft 29, has a suitably outlined groove, 241, in which lies a roller on the end of a lever 242, which is mounted midway of its length upon a bracket 243, on the side member 3 of the frame. The other end of this lever is attached to the lower end of a connecting rod 244, the upper end of which is attached to a short lever 245, on the end of a shaft 246, which is mounted in bearings 247, on a frame 248, mounted on the standard 1. A lever 249, is rigidly mounted on the shaft, and a link 250, connects the end of this lever with the forward end of a depressible, horizontal bar 251, which is connected at its ends, by links 252, to a slide bar 253, which is connected at one end to the frame 248, and at its other end to an arm 254, which is secured to the connecting bar 255, of the rear standards 54. The links 252 normally lie at an inclination, as shown and when the connecting rod 244, is depressed, by the movement of the cam 222, the lever 249, and link 250, are drawn upon and the bar 251, through its link connection with the slide bar 253, is depressed for a purpose to be presently shown.

Upon the slide bar 253, are mounted two slide members 256, which are separated by a suitable space, and these slides are connected on their under sides by a bar 257, to which are bolted two spaced blocks, 258, the forward one being longitudinally adjustable on said bar, its connecting bolt passing through a slot therein as shown in Fig. 21. These blocks have vertical slots in which are pivotally mounted hook shaped grippers 259, the free ends of which extend in a curve under the blocks, and terminate in flat horizontal faces which normally contact with short pins 260, which depend from the blocks, as will appear by reference to Fig. 17. The upper ends of these grippers, are rigidly secured upon shafts 261, which are rotatably mounted in the blocks, and extend beyond each side of the same. Collars 262, are secured to one end of the shafts, and coil springs 263, under tension, surround the shafts between the blocks and collars, their ends being secured to their respective collars and blocks. The tension of the springs normally holds the grippers closed, or in the position shown in Fig. 17. Upon the opposite ends of the shafts 261, are rigidly mounted lever arms 264, upon the upper portions of which are mounted friction rollers 265, which contact with the under edge of the bar 251. The levers 264 incline toward each other, as shown in Fig. 1, and the grippers open in opposite directions. When the bar 251 is depressed, in the manner before indicated, its under edge, pressing upon the rollers 265, rocks the levers 264 carrying the said rollers, and the grippers are thereby opened or swung out of contact with the cooperating pins 260. The grippers are spaced to correspond to the length of the blanks employed, and as the platen rises with a blank thereon, the grippers enter the groove 231, of the suction box 230 on the said platen, the opposite ends of the blank passing between them, and at the proper time the bar 251 is raised and the grippers engage the ends of the blank, immediately after which the platen drops to its normal position. The blank in its folded form is then carried forward to the spreader in the following manner:

The upper ends of the slides 256 are connected by a toothed bar 266, with which meshes a gear wheel 267 on a stub shaft 268, which is mounted on a bracket 269, which is secured to a cross bar 270, which rests upon and is secured to tie rods which connect the frame 248 and standards 54, the cross bar being further supported by uprights which rest upon the standard 2.

Adjoining the gear wheel 267, and movable therewith is a smaller gear wheel 271, which is in mesh with a larger gear wheel 272, which is mounted on a shaft 273, one end of which is mounted in the bracket 269, while the other end thereof is mounted in a vertical extension of the cross bar 270. This end of the shaft carries a pinion wheel 274, which meshes with a vertically disposed rack bar 275, which is slidably mounted in a guideway 276, on the vertical extension of the cross bar 270. The rack bar extends down for a considerable distance, and a connecting rod 277, connects its lower end with one end of a rock lever 278, mounted about centrally of its length on the standard 2. The other end of the rock lever carries a roller which enters a suitably outlined groove, in one side of a cam 279 on the shaft 29. When the lever 278 is rocked so as to draw the rack bar down, the gear wheel 267, is turned in the direction of the arrow—as shown by Fig. 19, and the toothed bar 266, carrying the slides 256, with their grippers and the blank held by said grippers are moved forward in position to deposit the blank upon a spreader. The reverse movement of the bar 275, restores the grippers to their normal position over the platen.

The spreader above referred to, stands in the line of travel of the grippers, and is adapted to receive the blanks from the grippers in folded form and spread them out on a horizontal plane in position to be conveyed to a box covering machine, which forms no part of the present invention. The spreader comprises a vertical bar 280, which is slidably mounted in a guideway 281, suitably supported upon the frame. The upper end of this bar is secured to the removable bottom plate of a horizontally disposed suction box 282, which extends in the direction of the line of travel of the grippers. The box consists of a bar, which is recessed to form a vacuum chamber 283, which is closed by the plate to which the bar 280 is secured. The upper edge of the box has a longitudinal groove 284, similar to that in the suction box on the platen, and on each side of this groove is a row of holes 285, which connect the chamber with the atmosphere, as shown by Figs. 25, 26 and 27. A nipple 286, is threaded to the bottom plate, and a flexible rubber tube 287, connects the nipple with a vacuum pump 288, similar to the pump 236, the lever 289 of the pump 288, being connected at one end to a support 290, on the side frame member 53, and operated by a cam 291 on the shaft 29, the operation of this pump being in all respects similar to the pump 236. The lower end of the bar 280, connects with a coil spring 292, the other end of which is secured to the floor. This spring exerts a continuous down pull on the bar 280, its downward movement being defined by a stop 293 carried thereby, which engages a cross bar 294, to which the guideway 281 is secured.

A vertically slidable bar 295, lies parallel with and adjacent to the bar 280, and the lower end of this bar 295, connects with one end of a rock lever 296, the opposite end of which is pivotally connected to the side member 53, of the frame. This lever carries a roller 297, about centrally of its length, which is operated by a suitably shaped cam groove in the adjacent side of the cam 279, by which the lever is rocked to raise and lower the bar 295. The upper end of this bar, is normally a short distance below the bottom of the suction box, and on the two opposite sides of the upper ends of this bar which face the ends of the suction box, are pivotally secured the lower ends of arms 298, the upper ends of which are pivotally secured to blocks 299, which are rigidly secured to the inner faces of a pair of thin metal plates 300, which are hinged at their upper edges to the suction box. It will thus be seen that when lever 296 is rocked to raise the bar 295, the plates or spreaders 300, are opened out, by means of the arms 298, and as the spreaders reach a horizontal plane, the upper end of the bar 295 engages the lower end of a pin 301, which projects from the bottom of the suction box, or more strictly speaking, from an angle bar 302, which connects the bottom plate of the suction box with the adjacent end of the bar 280, and a further movement of bar 295, raises the suction box and bar 280, a short distance, or until the top of the suction box is on the same plane with the portion of the blank held by the grippers 259. It will be noted, however, that the blank is conveyed to a point above the spreaders before they are opened out, and as they open out the blank is likewise spread out, and when the suction box is raised, as above described, the grippers 259, enter the groove 284 in the suction box, and release the blank as before described and at the same instant, the pump 288, is operated and a vacuum is made in vacuum chamber 283, of the suction box, by which the blank is held upon the spreader, the said blank closing the holes 285 in the suction box, as will be clearly understood by reference to the drawings. The spreaders, with the horizontally disposed blank is then lowered until the stop pin 293, engages the cross bar 294, this downward movement of the spreaders bringing the blank below the plane of the grippers, so that the blank will not be hooked by the forward gripper, as the grippers are returned to their normal position, which would otherwise be the case. Upon reaching the limit of its downward movement the vacuum is broken in the suction chamber 283, and the blank thereby released, and is immediately conveyed away from the spreaders in a horizontal position, in a manner, and by mechanism which forms no part of the present invention, and the spreaders are swung down in position to receive another blank. The spreaders are so hinged to the suction box, that when opened out, they are on the same plane with the upper edge of the box, and when folded down their upper portions lie in insets in the sides of the box, so as to be flush with its surface, as will be understood by Figs. 23, 24, and 26. The upper opposite ends of the spreaders are provided with hinge blocks 303, which lie in corresponding recesses in the sides of the box, and pins 304 are inserted in apertures extending in from the ends of the box and registering with similar apertures in the hinge blocks, whereby a suitable hinge connection is formed between the spreaders and box.

The mechanism for conveying the blanks from the feed table, while shown on one side of the machine only, may be duplicated on the other side thereof, if desired.

While I have illustrated and described the preferred construction and arrangement of my invention, I do not wish to be limited to the construction and arrangement shown, as many changes might be made without departing from the spirit of my invention.

Having described my invention, what I claim as new and desire to secure by Letters Patent, is:

1. In a blank-gumming machine, means for feeding and folding the blank, means for unfolding the blank, and means for completely gumming the surface of one side of the blank in three sections during one complete cycle movement of the machine.

2. In a blank-gumming machine, means for folding the blank, means for gumming said folded blank, means for unfolding the blank and means for transferring the gummed-blank from the machine in a flat condition.

3. In a blank gumming machine, means for feeding flat blanks into the machine, means for applying a narrow strip of gum across the center of their area as they feed into the machine, means for folding them after their centers have been gummed, and means for simultaneously coating both of the outside surfaces of each of said folded blanks from their gummed centers to their ends.

4. In a blank gumming machine, means for feeding flat blanks into the gumming machine and for applying gum to a narrow portion of the center of each blank as they are fed into the machine, means for then folding the blanks at their gummed centers, means for then gumming the opposite outside surfaces of said folded blanks, means for feeding said folded and gummed blanks from their gumming mechanism and for engaging them and spreading them out flat, means for engaging and moving said flat spread-out blanks from the spreading mechanism and feeding them from the gumming machine, all of said feeding and gumming actions being performed in each complete cycle movement of said gumming machine.

5. In a blank gumming machine, means for feeding blanks, means for gluing the central longitudinal portions thereof during the initial feeding movement, means for folding the blanks at their centers, and means for gumming the opposite outside surfaces of said folded blanks, said gumming operation being performed during one complete cycle movement of the gumming machine, and means for receiving said blanks from the folding means and for conveying them forward in their folded form and means for receiving them in folded form and spreading them out into a flat form.

6. In a blank gumming machine, means for feeding blanks, means for gumming their central longitudinal portions during the initial feeding movement, means for folding them at their centers, means for gumming the opposite outside surfaces of said folded blanks, said gumming operation being effected during one complete cycle movement of the gumming machine, means for receiving said folded blanks from the folding mechanism and for conveying them forward in their folded form, means for receiving the folded blanks and for spreading them out into a flat form, and means for operating the gumming, folding, conveying, and spreading mechanisms, and for restoring them to their initial positions.

7. In a gumming machine, means for feeding blanks into said machine and for stopping said blanks at a predetermined point, means including a reciprocating platen for folding said blanks centrally of their area so that their opposite sides will stand in vertical planes against the opposite sides of said platen, a set of gum distributing rolls arranged on each side of the path of said blanks and of said platen, and means for increasing the space between the gum distributing rolls during the drop of the platen.

8. A blank gumming machine provided with sets of blank gumming rollers, one set of which is adapted to apply gum to a narrow strip portion of the center of the area of each blank as each blank is fed into the machine, and the other sets of gum applying rollers are arranged opposite to each other and on opposite sides of a vertically reciprocating blank feeding platen that reciprocates between them, a blank carrying platen provided with air suction blank gripping apertures arranged to reciprocate vertically between said gumming rollers, means for feeding blanks to the first set of gum distributing rolls, means for folding blanks after their centers are gummed, over the edge of said platen, said oppositely arranged gumming rolls being arranged to distribute a coat of gum to the opposite outside surfaces of said folded blank as it is carried up between said gumming rolls.

9. In a blank gumming machine, means for feeding blanks in a flat condition into the machine, gum-applying means arranged to apply a narrow streak of gum across the center of the area of each blank as it is fed into the machine, means including a vertically reciprocating platen for folding and feeding said blanks upwardly, two oppositely opposed sets of gum distributing rolls arranged on opposite sides of said platen and adapted to coat the outside surfaces of each blank, each blank being folded over and carried up between said rolls by said platen, whereby a coat of gum will be applied to the outside surfaces of both of the sides of said blank simultaneously.

10. In a blank gumming machine, mechanism for feeding blanks into the machine, and for releasing them at a predetermined point, mechanism for folding said blanks centrally, mechanism arranged to coat the outside surfaces of the folded sides of said blanks with gum, and means for conveying said folded blank into contact with said gumming mechanism.

11. In a blank gumming machine, means for feeding blanks into the machine to a predetermined position, means for gumming the central longitudinal portions of said blanks during the initial feeding movement, mechanism for folding said blanks centrally to expose the outside surfaces of the opposite sides of the folded blanks in vertically disposed planes, means for gumming the opposite outside vertically disposed surfaces of the folded sides of said blanks, and means for conveying said blanks in their folded and gummed position beyond their side gumming means.

12. A blank gumming machine, provided with an adjustable set of gum distributing rolls, means for feeding blanks to a predetermined point relative to said rolls, means for folding said blanks centrally and for feeding them between and through and in contact with said gum distributing rolls, whereby the outside surfaces of said folded blanks are coated with gum, and means for engaging the inner surfaces of their inner sides, and for spreading said sides outwardly in opposite directions and changing the blanks from folded to straightened-out flat sided blanks.

13. A blank gumming machine, provided with an adjustable set of gum distributing rolls, means for feeding blanks to a predetermined point relative to said rolls, means for gumming the central longitudinal portions of said blanks during the initial feeding movement, means for folding said blanks centrally and for feeding them between and through and in contact with said gum distributing rolls, whereby the outside surfaces of said folded blanks are coated with gum, means for consecutively feeding said blanks, and means for engaging the inner surfaces of their inner sides, and for spreading said sides outwardly in opposite directions and changing the blanks from folded to straightened-out flat sided blanks.

14. In a gumming machine, means for completely coating one side of a blank of paper, fabric, or other suitable material with adhesive gum comprising gumming rolls a reciprocating platen arranged to engage and carry said blank between and in contact with said gumming rolls on one stroke of its reciprocal movement, and means for separating and moving said gum distributing rolls out of the path of said platen on the reverse movement of said platen.

15. In a blank gumming machine, means including gum pots for providing a supply of gum, means including gum distributing rolls mounted on said gum pots and arranged to receive blanks between them, means including a platen arranged to move reciprocally between said rolls and adapted to engage blanks one at a time and convey them between and into engagement with and beyond said gum distributing rolls, means for conveying said folded blanks away from said platen and means for receiving the folded blanks and for spreading them out flat.

16. In a blank gumming machine, means for feeding blanks in a flat straightened out position into a gumming machine, means for gumming said blanks centrally of their widths as they feed into the machine, means including gum pots and gumming rolls rotatably mounted on the same for distributing gum onto the blanks, a reciprocating platen arranged to engage said flat fed blanks centrally of their widths to fold them down against its opposite sides as it moves on its blank feeding stroke and to carry them between and in engagement with and beyond said rolls, whereby the opposite outside surfaces of said folded blank are coated with gum from contact with said gumming rolls.

17. In a blank gumming machine, means for feeding blanks in a flat straightened out position into a gumming machine, means for gumming them in a central line as they enter the machine, means including gum pots and gumming rolls rotatably mounted on the same, for distributing gum onto the blanks, a reciprocating platen arranged to engage said flat fed blanks centrally of their area with one of its edges and to fold them down against its opposite sides as it moves on its blank feeding stroke, means for moving said platen between and in engagement with and beyond said rolls, grippers for conveying the folded blanks away from the platen, spreaders for receiving the blanks in a folded state, and means for opening said spreaders to give the blank a flat horizontal position.

18. In a blank gumming machine, gum distributing means, means for feeding blanks to and in contact with said gum distributing means, whereby one side of each blank is coated with gum, grippers for conveying the blanks away from the blank feeding means, and means for receiving the blanks from the grippers and for spreading them out flat.

19. In a blank gumming machine, oppositely arranged gumming rolls, means for feeding blanks in gumming relation to said rolls, and means including a reciprocating platen for feeding blanks between and beyond said gumming rolls, and means for conveying the blanks away from said platen.

20. In a gumming machine, means including gumming rolls for completely coating one side of a sheet of any material, a reciprocating platen arranged to pass between said gumming rolls, means for providing said rolls with gum, and means for separating said rolls during the reverse movement of said platen.

21. In a gumming machine, means for feeding blanks of paper or other material, into said machine, means including two oppositely arranged sets of gum feeding rolls, a reciprocating blank supporting platen arranged to engage said blanks and carry them one at a time between and in contact with said gumming rolls, means for removing said blanks from said platen after said blanks have been gummed, and means for moving said gumming rolls apart on the return stroke of said platen.

22. In a blank gumming machine, the combination of means for feeding blanks thereto in a flat condition, means for coating each blank with a narrow streak of gum across the central portion of the area of each blank as it feeds into the machine, a set of opposing blank gumming rolls and supporting glue pots provided with a supply of glue arranged in operative gum coating relation to said blanks, means including a platen arranged to reciprocate between said rolls and provided with a row of air suction blank gripping apertures for folding and holding each blank and for feeding it between said rolls, means for feeding each gummed blank from the platen, means for straightening the blank out again into a flat condition, and means for feeding the blanks in a straightened out flat condition from the gumming machine.

23. In a blank gumming machine, the combination of gum feeding rolls and means including suitable blank feeding mechanism for feeding blanks one at a time beneath said gum feeding rolls, and a reciprocating platen arranged to engage a blank with its edge and fold it against its opposite sides, and move it up between and in engagement with said gum feeding rolls, means for operating said platen, means for conveying said blanks away from said platen in folded condition, and means for receiving and for spreading out said blanks.

24. In a gumming machine, the combination with a supporting frame provided with a feed table, of a blank feeder for conveying blanks from said table into said machine, oppositely arranged gum pots on said machine, gum distributing rollers in said gum pots, a reciprocating platen arranged to engage a blank and carry it up between and beyond said gum distributing rolls, means for imparting an intermittent movement to said platen, and means for spreading the rollers as the platen drops.

25. In a blank gumming machine as specified, the combination with a supporting frame, provided with a feed table, of means for feeding blanks from said table into said machine to a predetermined point, two opposing and parallel sets of glue distributing rollers above the stopping point of said blanks, a thin platen positioned below the stopping point of said blanks and adapted to engage said blanks centrally of their area and to fold them against its opposite sides and carry them up between and in contact with and beyond said rollers, a transmitting mechanism for moving said blanks from said platen, and means for receiving and for spreading said gummed blanks out flat and in position to be removed from the gumming machine.

26. In a blank gumming machine, the combination with a supporting frame provided with a feed table, of means for feeding blanks one at a time from said table into said blank gumming machine in a flat horizontal position, means including a reciprocating platen arranged to engage each blank centrally of its area and to fold it against its opposite sides, two sets of gum distributing rolls arranged to receive said platen between them and to engage and to coat the opposite sides of each blank as it is fed between and through said gumming rolls, and means for conveying said blanks away from said platen.

27. In a blank gumming machine, the combination of a feed table, blank feeding and positioning mechanism, a reciprocating platen, gum pots and gum distributing rollers arranged above said reciprocating platen, said platen being adapted to engage each blank and carry it up between said rolls, mechanism for operating said platen, and trips operated by said blanks for releasing the mechanism that operates the platen.

28. In a blank gumming machine, the combination with gum distributing rolls, trunnion ended frames arranged to support said gum distributing rolls in swinging relation to each other, of a platen arranged to reciprocate between said rolls, means for swinging said roll-supporting frames away from each other and from the platen at a predetermined point on its upward movement, and means for cushioning the backward swinging movement of said roll supporting frames.

29. In a blank gumming machine, the combination of a supporting frame, gum pots, gum receiving and regulating rolls mounted on said pots, gum distributing rolls in contact with the gum receiving rolls and swinging frames for supporting them, said frames being mounted to be moved away and toward each other, a taper ended bar arranged to pass centrally between the ends of said swinging frames to move said gum distributing rolls away from each other at a predetermined time, cushioning means for said supporting frames, means for feeding blanks to a point below said distributing rolls, a platen for engaging and moving said blanks up between and in contact with said distributing rolls, means for operating said platen and means for cushioning the drop of the platen.

30. In a blank gumming machine, the combination of the supporting frame, the supplementary and the auxiliary shafts, and the platen reciprocally mounted in said supporting frame to move vertically therein, said platen being provided with a toothed rack, gearing meshing with said toothed rack and driven from said supplementary shaft for raising said platen, means including a cam mounted on said auxiliary shaft and lever mechanism connected therewith, for releasing said platen from its raising mechanism at the limit of its upper movement, and means for engaging said platen near the end of its upward movement and raising it positively to a predetermined point independently of said gearing and supplementary shaft's driving mechanism, said means comprising a projecting lug on the lower end of said platen, a dog pivotally mounted on said supporting frame in position to engage said lug on the upward stroke of said platen, and means including a cam on said auxiliary shaft and levers connecting said cam with said dog for positively raising said platen to a predetermined point at each upward stroke of its reciprocal movement.

31. In a blank gumming machine, the combination of a supporting frame provided with guideways, a platen reciprocating vertically in said guideways, means including cam operated lever mechanism and gearing for raising said platen and for releasing the same at the top of its upward stroke, a piston plunger at the bottom of said platen, and an air cushioning dash pot cylinder arranged below said piston plunger to receive the same on the return movement of said platen.

32. In a blank gumming machine, the combination of the reciprocating platen, provided with a piston plunger at its lower end, means including gearing and cam actuated levers for raising said platen, and an air cushioning cylinder arranged to receive said piston plunger for cushioning said platen on its return movement.

33. In a blank gumming machine, the combination with pivoted parallel frames, gumming rolls mounted therein, and a platen for conveying blanks up between said rolls, of means for spreading said frames apart as the platen reaches the limit of its upward movement, and for holding them thus until the platen descends to its normal position.

34. In a blank gumming machine, the combination with parallel pivotally mounted frames, gumming rolls mounted therein, and a platen for carrying blanks up between said rolls, of means for spreading said frames apart, as the platen reaches the limit of its upward movement and for holding them thus until the platen descends to its normal position, and means for cushioning the outward movements of said frames.

35. In a blank gumming machine, the combination with parallel rocking frames, coöperating gumming rolls mounted in said frames, means for defining the normal space between said rolls, means for engaging blanks and for lifting them in folded positions up between and in contact with said rolls, means for swinging said frames outward as the blank carrying means reaches the limit of its upward movement and for holding them thus until the said blank lifting means descends to its normal position, and resilient means for cushioning the outward movements of said frames.

36. In a blank gumming machine, the combination with parallel swinging frames, gumming rolls mounted therein, means for defining the normal space between said rolls, a platen and means for lifting the same to carry blanks folded over its upper edge, up between and in contact with said rolls, a lever having a wedge portion, means for raising said lever to force its wedge portion between the opposing ends of said frames to move them apart as the platen reaches the limit of its upward movement, and for holding them thus until the platen drops to its normal position, and means for cushioning the outward movements of the said frames.

37. In a blank gumming machine, the combination with parallel frames pivoted to have a swinging movement, gumming rolls mounted therein, a power lifted platen adapted to carry blanks folded over its upper edge up between and in contact with said rolls, means for defining the normal space between said rolls, means for swinging the frames apart as the platen reaches the limit of its upward movement, and for holding them thus until it drops to its normal position, and means for cushioning the outward movements of said frames comprising rods pivotally connected at one end to the frames and slidably mounted in fixed bearings at their outer ends, adjustable collars on said rods, and coil expansion springs surrounding said rods and interposed between the collars and the fixed bearings.

38. In a gumming machine, means for feeding blanks to a predetermined point, a vertically movable platen adapted to engage said blanks centrally of their areas and fold them over its upper edge, a suction box on the upper edge of said platen, a vacuum pump and a flexible tube connecting said box and pump, whereby a vacuum is formed in the box when the blank is engaged by the platen and whereby said blank is held, parallel rolls between which the folded blank is passed by the platen, means for spreading the rolls as the platen reaches the limit of its upward movement and for holding them thus until it drops to its normal position, and means for receiving the blanks and for conveying them away from the platen.

39. In a gumming machine, the combination with a vertically movable platen, a suction box along the upper edge of said platen, a vacuum pump and a flexible tube connecting the box and pump, means for feeding blanks to a position above said suction box, thereby to be engaged midway of their lengths by said platen suction box as the platen ascends, said pump being operated to make and break a vacuum in said box, at predetermined times thereby to hold and release the contacting platens, parallel gumming rolls between which said platen passes, means for spreading the rolls as the platen reaches the limit of its upward movement and for holding them thus until the platen descends, and means for receiving and for conveying the blanks away from the platen.

40. In a gumming machine, the combination with parallel gumming rolls, means for carrying centrally folded blanks between said gumming rolls, and means for receiving and for conveying said folded blanks away from said blank carrying means, of means for receiving said blanks from the conveying means in folded form and for spreading them out flat.

41. In a gumming machine, the combination with parallel gumming rolls, a platen for folding blanks centrally and carrying them up between and in contact with said gumming rolls, and grippers for removing the blanks from the platen and conveying them forward, of means for receiving the blanks from the gripper in folded form and for spreading them out in flat horizontal form.

42. In a gumming machine, the combination with parallel gumming rolls, means for feeding blanks to a position below said rolls, a platen for engaging said blanks centrally and for carrying them folded over its edge up between said rolls, and grippers for removing said blanks from said platen and for conveying them forward, of means for receiving said blanks from said grippers in folded form and for spreading them out flat comprising a longitudinal body member, plates hinged at their upper edges to said body portion, which normally stand vertical and parallel with respect to each other, and means for swinging said plates to a horizontal position.

43. In a gumming machine, the combination with parallel gumming rolls, means for feeding blanks to a position below said rolls, a platen for engaging said blanks centrally and for carrying them in folded position up between and in contact with said rolls, and means for receiving the blanks in folded form and conveying them forward, of means for receiving said blanks from the conveying means and spreading them out flat comprising a longitudinal suction box, plates hinged at their upper edges to said suction box, which normally lie vertical and parallel with respect to each other, means for alternately making and breaking a vacuum in said suction box at predetermined times thereby to hold or release the contacting blanks, and means for swinging said plates to a horizontal position.

44. In a blank gumming machine, the combination with parallel gumming rolls, means for feeding blanks to a position below said rolls, a platen for engaging said blanks centrally and for carrying them in folded position up between and in contact with said rolls, and grippers for removing said blanks from the platen and for conveying them forward in folded form, of a spreader for receiving said blanks from the grippers consisting of a longitudinal suction box having a central groove lengthwise of its upper edge to accommodate said grippers and a row of holes on each side thereof communicating with an interior chamber, and hinged plates depending vertically from its opposite sides, a vacuum pump, a flexible tube connecting said suction box chamber and pump, said pump being arranged to alternately make and break a vacuum in said chamber thereby to hold or release a contacting blank, means for spreading said wings to a horizontal position and for depressing said spreader to permit the return movement of the gripper without engaging the blank.

45. In a blank gumming machine, means for receiving gummed blanks in folded form and for unfolding them to a flat form comprising a horizontal bar having an interior chamber and rows of holes forming communication between the chamber and the atmosphere, vertically disposed plates hinged at their upper edges to the opposite sides of said bar, a vacuum pump, a flexible tube connecting the interior of said hollow bar and said pump, said pump being arranged to alternately make and break a vacuum in said chamber whereby a blank is held upon or released from the bar, means for supporting said bar, a rod, links connected to the upper end of said rod and to said hinged plates, and means for raising said rod, whereby the plates are swung to horizontal positions, through the medium of the links.

46. In a blank gumming machine, the combination with parallel gumming rolls, a platen for engaging blanks centrally and carrying them in folded position up between said rolls, and means for spreading said blanks out flat, of means for conveying said blanks from the platen to the said spreading means comprising a supporting bar, spring-closed grippers on said bar, means for opening said grippers, and means for reciprocating said bar.

47. In a blank gumming machine, the combination with parallel gumming rolls, a platen for engaging blanks centrally and carrying them in folded form up between said rolls, and means for spreading said blanks out flat, of means for conveying said blanks from the platen to the spreading means comprising a supporting bar, spring-closed grippers on said bar, a slide bar, slides on said bar connected to the gripper supporting bar, means for opening said grippers, and means for reciprocating said gripper-supporting bar.

48. In a blank gumming machine, the combination with parallel gumming rolls, a platen for engaging blanks centrally and for carrying them in folded form up between said rolls, and means for spreading said blanks out flat, of means for conveying the blanks from the platen to the spreading means comprising a slide bar, slides thereon connected at their upper ends by a rack bar and at their lower ends by a supporting bar, blocks on the supporting bar having short depending pins, hook shaped spring-closed grippers pivotally mounted in said blocks having operating levers, said grippers being arranged to open in opposite directions with respect to each other, their free ends being in normal engagement with said pins, a depressible bar for bearing on said levers to open said grippers, and means for depressing said bar, a vertical rack bar, gearing connecting said vertical rack bar, and the rack bar connecting said slides, and means for reciprocating said vertical slide bar, whereby the gearing is operated to reciprocate the rack bar connecting said slides.

49. In a blank gumming machine, the combination with parallel gumming rollers, a platen for engaging blanks centrally and carrying them in folded condition up between said rolls, and means for spreading the blanks out flat, of means for conveying the blanks from the platen to the spreading means comprising a slide bar, slides thereon connected at the upper end by a rack bar and at their lower ends by a supporting bar, blocks mounted on the supporting bar one of which is adjustable thereon, said blocks having short depending pins, pintles rotatably mounted in said blocks, hook shaped grippers rigidly secured upon said pintles, tension springs on one end of said pintles which hold the free ends of the grippers in normal contact with the depending pins, levers on the opposite ends of said pintles having rollers thereon, a horizontal presser bar having a link connection with the slide bar and resting on said rollers, levers and a cam for depressing said presser bar whereby the gripper levers are depressed and the grippers opened, a vertical rack bar and means for reciprocating the same, and gearing connecting the vertical rack bar with the horizontal rack bar connecting the said slides, whereby the supporting bar with its grippers is reciprocated.

50. In a blank gumming machine, comprising mechanism for first feeding a flat blank in a horizontal plane into the machine, then folding said blank and feeding it at right angles to its horizontal feeding in position and then applying a coat of gum to the surfaces thereof, and then moving said folded and gummed blank again in a horizontal plane and spreading it again out flat, and discharging it from the machine, the combination with a feed table, of means for conveying blanks therefrom to a predetermined point, comprising an endless chain, a carriage mounted to slide parallel with and adjacent to said chain, a spring closed gripper on said carriage, a projection on said chain, pivoted hooks on said carriage one of which is engaged by the said projection when it is on the upper lap of the chain, the other hook being engaged, when the projection is on the lower lap of the chain whereby the carriage is moved back and forth, means for disconnecting the engaged hook at the forward and backward stopping points of the carriage and for moving the other hook in position to be engaged by the said projection when the same shall have traveled around to that point, and means for opening the gripper at its forward and backward stopping points.

51. In a blank gumming machine, comprising mechanism for first feeding a flat blank in a horizontal plane into the machine, then folding said blank and feeding it at right angles to its horizontal feeding in position and then applying a coat of gum to the surfaces thereof, and then moving said folded and gummed blank again in a horizontal plane and spreading it again out flat, and discharging it from the machine, the combination with a feed table, of means for conveying blanks therefrom to a predetermined point comprising a carriage, a spring-closed gripper thereon, means for moving said carriage back and forth and for stopping it at the limit of its movements and means for opening said gripper as the carriage reaches the limit of its movement in each direction.

52. In a blank gumming machine, comprising mechanism for first feeding a flat blank in a horizontal plane into the machine, then folding said blank and feeding it at right angles to its horizontal feeding in position and then applying a coat of gum to the surfaces thereof, and then moving said folded and gummed blank again in a horizontal plane and spreading it again out flat, and discharging it from the machine, the combination with a feed table, of means for conveying blanks therefrom to a predetermined point comprising an endless chain having a lateral lug on one of its links, a slidably mounted carriage adjacent to and having a movement parallel with said chain, oppositely pointing hooks pivotally connected to said carriage one above the other and a link connecting said hooks whereby they are moved in unison, a depending tail on the lower hook, the upper hook being adapted to be engaged by the chain lug when it is on the upper lap of the chain, the lower hook being engaged by said lug when it is on the lower lap of the chain, stops at the termini of the carriage which engage the said tail, whereby the engaged hook is disconnected from the lug and the carriage brought to a stop, and the other hook is simultaneously moved in position to be engaged by the said lug when it shall have traveled around to that point, thereby to reverse the direction of the carriage, movable means for opening the gripper at the feed table and for closing it again to grip a blank, and means for opening the grip to release the blank at the limit of its forward movement.

53. In a blank gumming machine, comprising mechanism for first feeding a flat blank in a horizontal plane into the machine, then folding said blank and feeding it at right angles to its horizontal feeding in position and then applying a coat of gum to the surfaces thereof, and then moving said folded and gummed blank again in a horizontal plane and spreading it again out flat, and discharging it from the machine, the combination with a feed table, of means for conveying blanks therefrom to a predetermined point comprising a track, a carriage slidable thereon, a spring-closed gripper on said carriage having an operating portion, an endless chain adjacent to and parallel with the track having a lateral lug on one of its links horizontally disposed, and oppositely pointing hooks pivoted to said carriage and spaced to correspond to the laps of the chain, and being arranged to be engaged independently by the said chain lug as it travels, said hooks being connected by a link thereby to be moved in unison, a tail on one of the hooks, stops at the termini of the carriage for engaging said tail whereby the hook engaged by the lug is disconnected therefrom, and the other hook is positioned to be engaged by the lug when it shall have traveled around to that point, the chain laps being of greater length than the distance between the termini of the carriage, means for preventing sagging of the chain, a spring dog for operatively locking the hooks, a movable cam plate at the feed terminus of the carriage to engage the gripper operating portion to open the said gripper and to move out of contact therewith to permit the gripper to close upon a blank, and a cam plate at the opposite terminus of the carriage to open the gripper and release the blank.

54. In a blank gumming machine, comprising mechanism for first feeding a flat blank in a horizontal plane into the machine, then folding said blank and feeding it at right angles to its horizontal feeding in position and then applying a coat of gum to the surfaces thereof, and then moving said folded and gummed blank again in a horizontal plane and spreading it again out flat, and discharging it from the machine, the combination with a feed table, of a blank gripper adapted to have a reciprocating movement between said table and a predetermined point, means for reciprocating said gripper, means for opening the same to receive a blank and for permitting the same to close upon a blank at said feed table, means for opening the gripper to release the blank at the opposite terminus of the same, and means for stopping the gripper at each terminus.

55. In a blank gumming machine, the combination with a feed table, of a gumming roll adapted to coat a blank centrally of its length as it leaves said table, a presser roll which coöperates with said gumming roll, and means for moving said presser roll in and out of coöperating position.

56. In a blank gumming machine, the combination with a feed table, of a gumming roll adapted to coat a blank centrally of its area as it leaves said table, a presser roll which engages the under side of said blank to press the same against the gumming roll, means for raising said roll to engage the blank, and for depressing said roll as the blank passes from between it and the said gumming roll.

57. In a blank gumming machine, the combination with a feed table, of a gumming roll adapted to coat a blank centrally of its area as it leaves said table, a rock lever, a presser roll mounted thereon to engage the said blank and press it against the gumming roll as it passes forward, means for rocking said lever to cause the presser roll to coöperate with the gumming roll as the blank passes between them and for moving the roll out of contact with said blank, and means for preventing the rocking of the lever.

58. In a blank gumming machine, the combination with a feed table, of a gumming roll adapted to coat a blank centrally of its area as it leaves said table, a rock lever, a presser roll mounted thereon, a slidable bar, a link connecting one end of said rock lever and said bar, a cam for normally holding said bar elevated, whereby the presser roll is held away from the gumming roll, means for depressing the bar when the cam permits, whereby the presser roll is moved to press said blank against the gumming roll and means whereby rocking of the lever is prevented when a blank is not fed from the table.

59. In a blank gumming machine, the combination with a feed table, of a gumming roll adapted to coat a blank centrally of its area as it leaves said table, a rock lever, a presser roll mounted thereon to engage the said blank and press it against the gumming roll as it passes between them, a slide bar for rocking said lever to cause the presser roll to coöperate with the gumming roll as the blank passes between them, means for locking said slide bar to prevent rocking of the lever, means for operating said locking means, and a slidable pin adapted to prevent the action of the means for operating the locking means, when a blank is in position on the feed table to pass into the machine, the pin resting on said blank, said table having an aperture through which said pin drops when a blank is not fed forward upon the table, whereby the means for operating the locking means is permitted to operate the same to lock the slide bar and thus prevent contact of the presser roll with the gumming roll.

60. In a blank gumming machine, the combination with a feed table, a gumming roll adapted to coat blanks centrally of their area as they leave the table, a coöperating presser roll, a rock arm upon which said roll is mounted, a slide bar connected with said rock arm, a cam for elevating said slide bar and a spring for exerting a continuous down pull upon the same, whereby the rock arm is operated to cause the presser roll to contact with a blank and press the same against the gumming roll, or to move and hold the said presser roll away from the gumming roll, of means for locking the slide bar against downward movement comprising a slidable locking pin, a rock shaft connected therewith, a second rock shaft connected by a rod with the first rock shaft and having an arm on one end, a shaft having a bell crank lever on one end thereof, and means for rocking said shaft, a gravity pin supported by the horizontal portion of said bell crank and adapted to be supported by a blank when dropped by the bell crank, a horizontally disposed slide pin mounted in line with the arm on the end of said second rock shaft and adapted to be operated by the vertical member of said bell crank lever, said gravity pin forming a stop for the horizontal pin when a blank is in feeding position, said pin being dropped below the line of the slide pin when a blank is not moved to feeding position, whereby the slide pin engages the arm on the said second rock shaft and the first rock shaft is operated to actuate the locking pin and cushioned means on the slide pin, which permits the full movement of the bell crank when the slide pin is stopped by the gravity pin.

61. In a blank gumming machine, the combination with a feed table, a gumming roll and a coöperating rock-lever-supported presser roll between which blanks are fed, a slide bar for operating said rock lever, and means for locking said slide bar including a rock shaft having an operating arm, of means for actuating said rock shaft comprising a cam-actuated shaft having a bell crank lever on one end, a slide pin in line with the operating arm of said rock shaft having a yieldable collar with which one arm of said bell crank engages a gravity pin, the upper end of which normally acts to limit the movement of the slide pin, said gravity pin being normally supported by the other arm of said bell crank far enough above the feed table to permit of a blank being passed beneath the same, said blank being adapted to support it when it is dropped by the bell crank, said yieldable collar permitting the bell crank to complete its movement when the slide pin engages the gravity pin, said gravity pin being dropped below the plane of the slide pin when a blank has not been passed below it, whereby the slide pin engages the arm of the said rock shaft and turns the same to effect the movement of the said locking pin.

62. In a blank-gumming machine, a reciprocating platen, means for feeding blanks over said platen, gumming rolls at the sides of the path of travel of said platen, said platen having suction means for holding the blanks in its movement.

63. In a blank-gumming machine, a reciprocating platen, means for feeding blanks over said platen, gumming rolls at the sides of the path of travel of said platen, said platen having suction means for holding the blanks in its movement, and means for discontinuing the suction when said platen has reached the limit of its operating stroke.

64. In a blank-gumming machine, a reciprocating platen, means for feeding blanks over said platen, gumming rolls at the sides of the path of travel of said platen, means for operating said platen to carry the blanks between and in contact with said gumming rolls and thus to fold the blanks, a suction table for spreading the folded blanks, and means for transferring the folded blanks from said platen to said table.

In testimony whereof I affix my signature in presence of two witnesses.

MELVILLE E. PETERS.

Witnesses:
G. SARGENT ELLIOTT,
KATHERINE V. BAKER.